US012555505B2

(12) United States Patent
Su et al.

(10) Patent No.: US 12,555,505 B2
(45) Date of Patent: Feb. 17, 2026

(54) DISPLAY METHOD FOR FOLDABLE SCREEN AND ELECTRONIC DEVICE

(71) Applicant: Honor Device Co., Ltd., Shenzhen (CN)

(72) Inventors: Yi Su, Shenzhen (CN); Wei Qu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/869,090

(22) PCT Filed: Sep. 6, 2023

(86) PCT No.: PCT/CN2023/117250
§ 371 (c)(1),
(2) Date: Nov. 25, 2024

(87) PCT Pub. No.: WO2024/131143
PCT Pub. Date: Jun. 27, 2024

(65) Prior Publication Data
US 2025/0391300 A1  Dec. 25, 2025

(30) Foreign Application Priority Data
Dec. 23, 2022 (CN) .......................... 202211669594.6

(51) Int. Cl.
*G09G 3/00* (2006.01)
*G06F 1/16* (2006.01)
(Continued)

(52) U.S. Cl.
CPC .......... *G09G 3/035* (2020.08); *G06F 1/1652* (2013.01); *G09G 3/2011* (2013.01);
(Continued)

(58) Field of Classification Search
CPC .... G06F 1/1652; G06F 1/1677; G06F 1/1641; G06F 3/04886; G06F 2203/04803;
(Continued)

(56) References Cited

U.S. PATENT DOCUMENTS

2009/0219237 A1  9/2009  Yamazaki et al.
2018/0342192 A1* 11/2018  Lee ........................ G09G 3/035
(Continued)

FOREIGN PATENT DOCUMENTS

CN  101520978 A  9/2009
CN  104282285 A  1/2015
(Continued)

*Primary Examiner* — Dismery Mercedes
(74) *Attorney, Agent, or Firm* — Conley Rose, P.C.

(57) ABSTRACT

A display method for a foldable screen and an electronic device can resolve a split-screen problem that when a foldable screen of the electronic device transitions from a folded state to an unfolded state, brightness of the unfolded foldable screen is inconsistent. The method includes, outputting, in response to a transition of the foldable screen from the unfolded state to the folded state, a first pulse signal to a first screen, and outputting a second pulse signal and a third pulse signal that periodically and alternately change to a second screen. The second pulse signal and the third pulse signal that periodically and alternately change are used to control a threshold voltage of a transistor on the second screen to remain within a preset range.

20 Claims, 10 Drawing Sheets

(51) Int. Cl.
  *G09G 3/20* (2006.01)
  *G09G 3/3225* (2016.01)
  *G09G 3/3233* (2016.01)
  *G09G 3/3266* (2016.01)
  *G09G 3/3275* (2016.01)

(52) U.S. Cl.
  CPC ......... *G09G 3/3225* (2013.01); *G09G 3/3266* (2013.01); *G09G 3/3275* (2013.01); *G09G 2300/0408* (2013.01); *G09G 2310/0281* (2013.01); *G09G 2310/0286* (2013.01); *G09G 2310/08* (2013.01); *G09G 2320/0233* (2013.01); *G09G 2320/045* (2013.01); *G09G 2330/026* (2013.01)

(58) Field of Classification Search
  CPC .......... G06F 2203/04102; G09G 3/035; G09G 2354/00; G09G 2380/02; G09G 2340/0407; G09G 2340/04; G09G 3/3696; G09G 3/3225; G09G 3/3266; G09G 2320/0233; G09G 2300/0408; G09G 3/3291; H10K 2102/311; H10K 77/111
  See application file for complete search history.

(56) References Cited

U.S. PATENT DOCUMENTS

| | | | |
|---|---|---|---|
| 2020/0357362 A1* | 11/2020 | Shin | G09G 3/3233 |
| 2020/0388228 A1 | 12/2020 | Oh et al. | |
| 2021/0005144 A1* | 1/2021 | Long | G09G 3/3266 |
| 2021/0027683 A1* | 1/2021 | Seo | G09G 3/3233 |
| 2021/0027713 A1* | 1/2021 | Lee | G09G 3/3233 |
| 2021/0035489 A1* | 2/2021 | Seo | G09G 3/035 |
| 2021/0201813 A1 | 7/2021 | Oh et al. | |
| 2021/0407351 A1* | 12/2021 | Huang | G11C 19/28 |
| 2021/0407352 A1 | 12/2021 | Seo et al. | |
| 2022/0122500 A1* | 4/2022 | Wai | G09G 3/2014 |
| 2022/0269314 A1 | 8/2022 | Chen et al. | |
| 2022/0413553 A1 | 12/2022 | Zhang et al. | |
| 2025/0044856 A1* | 2/2025 | Ma | G06F 1/3218 |

FOREIGN PATENT DOCUMENTS

| | | |
|---|---|---|
| CN | 109147664 A | 1/2019 |
| CN | 110189724 A | 8/2019 |
| CN | 110806829 A | 2/2020 |
| CN | 111276096 A | 6/2020 |
| CN | 111354306 A | 6/2020 |
| CN | 111540327 A | 8/2020 |
| CN | 111915987 A | 11/2020 |
| CN | 112201206 A | 1/2021 |
| CN | 112309299 A | 2/2021 |
| CN | 112309327 A | 2/2021 |
| CN | 112860359 A | 5/2021 |
| CN | 113936605 A | 1/2022 |
| KR | 20180078767 A | 7/2018 |
| KR | 20210144400 A | 11/2021 |
| KR | 20220036174 A | 3/2022 |
| WO | 2021000233 A1 | 1/2021 |

* cited by examiner

DISPLAY METHOD FOR FOLDABLE SCREEN AND ELECTRONIC DEVICE

CROSS-REFERENCE TO RELATED APPLICATIONS

This is a U.S. National Stage of International Application No. PCT/CN2023/117250, filed on Sep. 6, 2023, which claims priority to Chinese Patent Application No. 202211669594.6, filed on Dec. 23, 2022, both of which are hereby incorporated by reference in their entireties.

TECHNICAL FIELD

This application relates to the field of display technologies, and in particular, to a display method for a foldable screen and an electronic device.

BACKGROUND

With continuous development of electronic devices, increasing electronic devices with a display screen, for example, mobile phones with a display screen, are widely used in people's daily life and work. In addition, it is not difficult to find that with development of screen technologies, display screens of the electronic devices are becoming increasingly large, to provide richer information for users and bring better use experience to the users.

However, an excessively large display screen of the electronic device seriously affects portable performance of the electronic device. Therefore, foldable-screen electronic devices (for example, foldable-screen mobile phones) proposed in recent years are a future development direction of the electronic devices. A foldable screen may be folded into at least two screens (for example, a first screen and a second screen). After the foldable screen is folded, the electronic device may display a picture on a screen (for example, the first screen), and display no picture on another screen (for example, the second screen).

Currently, picture display of the foldable screen of the electronic device is usually implemented by a gate driven on array (GOA) in a row-by-row scanning driving manner. In a related technology, when the electronic device displays no picture on the second screen, a GOA signal in the GOA circuit is in a direct current (DC) bias state for a long time. This DC state affects a transistor on the foldable screen, for example, causes a threshold voltage Vth of the transistor to drift. Consequently, when the foldable screen of the electronic device transitions from a folded state to an unfolded state, there is a split-screen problem that brightness of the unfolded foldable screen is inconsistent.

SUMMARY

Embodiments of this application provide a display method for a foldable screen and an electronic device, to resolve a split-screen problem that when a foldable screen of the electronic device transitions from a folded state to an unfolded state, brightness of the unfolded foldable screen is inconsistent.

To achieve the foregoing objective, the following technical solutions are used in the embodiments of this application.

According to a first aspect, a display method for a foldable screen is provided. The method is applied to an electronic device with a foldable screen. The foldable screen is foldable to form at least two screens, the at least two screens include a first screen and a second screen, and when the foldable screen is in a folded state, the first screen and the second screen face away from each other. The first screen includes W rows of sub pixels, the second screen includes N rows of sub pixels, and W and N are positive integers. The method includes: In response to a transition of the foldable screen from an unfolded state to the folded state, the electronic device outputs a first pulse signal to the first screen, and outputs a second pulse signal and a third pulse signal that periodically and alternately change to the second screen. The second pulse signal and the third pulse signal that periodically and alternately change are used to control a threshold voltage of a transistor on the second screen to remain within a preset range. The electronic device successively scans all rows of sub pixels in the W rows of sub pixels under the control of the first pulse signal, and writes a first data voltage into each row of sub pixels under the control of the first pulse signal during scanning of the sub pixels. The first data voltage is used to control the first screen to be turned on. The electronic device successively scans the N rows of sub pixels under the control of the second pulse signal, and writes a second data voltage into each row of sub pixels under the control of the second pulse signal during scanning of the sub pixels. The second data voltage is used to control the second screen to be blank. The electronic device does not scan the N rows of sub pixels under the control of the third pulse signal.

On the basis of the first aspect, in this application, when the foldable screen transitions from the unfolded state to the folded state, the electronic device outputs the first pulse signal to the first screen, and outputs the second pulse signal and the third pulse signal that periodically and alternately change to the second screen. Because the second pulse signal and the third pulse signal that periodically and alternately change are used to control the threshold voltage of the transistor on the second screen to remain within the preset range, after the foldable screen transitions from the folded state to the unfolded state, a split-screen problem that brightness of the unfolded foldable screen is consistent due to a threshold voltage drift can be resolved. In addition, in this application, the electronic device successively scans all the rows of sub pixels in the W rows of sub pixels under the control of the first pulse signal, and writes the first data voltage into each row of sub pixels under the control of the first pulse signal during scanning of the sub pixels, to control the first screen to be turned on. The electronic device successively scans the N rows of sub pixels under the control of the second pulse signal, and writes the second data voltage into each row of sub pixels under the control of the second pulse signal during scanning of the sub pixels, to control the second screen to be blank. The electronic device does not scan the N rows of sub pixels under the control of the third pulse signal, to control the second screen to be blank.

In a possible implementation of the first aspect, the electronic device includes a display driver integrated circuit DDIC; and that the electronic device outputs a first pulse signal to the first screen, and outputs a second pulse signal and a third pulse signal that periodically and alternately change to the second screen includes: The electronic device controls the DDIC to output the first pulse signal to the first screen and output the second pulse signal and the third pulse signal that periodically and alternately change to the second screen.

In this implementation, the electronic device may control the DDIC to output the first pulse signal to the first screen and output the second pulse signal and the third pulse signal that periodically and alternately change to the second screen, so that reliability of the pulse signal is improved.

In a possible implementation of the first aspect, the electronic device includes a display phase and a non-display phase in each image display frame; and that the electronic device controls the DDIC to output the first pulse signal to the first screen and output the second pulse signal and the third pulse signal that periodically and alternately change to the second screen includes: In the first image display frame in n image display frames, the electronic device delivers a first control command to the DDIC in the non-display phase. The first control command is used to control the DDIC to output the first pulse signal to the first screen and output the second pulse signal to the second screen in the display phase in the n image display frames. After display of the n image display frames is completed, in the first image display frame in m image display frames, the electronic device delivers a second control command to the DDIC in the non-display phase. The second control command is used to control the DDIC to output the first pulse signal to the first screen and output the third pulse signal to the second screen in the display phase in the m image display frames, and n and m are positive integers. The electronic device periodically delivers the first control command and the second control command to the DDIC, to control the DDIC to output the first pulse signal to the first screen and output the second pulse signal and the third pulse signal that alternately change to the second screen.

In this implementation, the electronic device may deliver the first control command to the DDIC on a non-display phase, or deliver the second control command to the DDIC on a non-display phase, to resolve a split-screen problem that brightness of the unfolded foldable screen is inconsistent, without affecting display image quality.

In a possible implementation of the first aspect, the foldable screen includes a display panel, the display panel has a display area and a peripheral area around the display area, the peripheral area is provided with a first group of shift registers and a data driver that are connected to the DDIC, and the first group of shift registers is connected to each row of sub pixels in the N rows of sub pixels and is configured to scan each row of sub pixels. N is a positive integer. The data driver is configured to provide a data voltage for each row of sub pixels during scanning of the sub pixels. The second pulse signal includes a first start signal, and the third pulse signal includes a second start signal. That the electronic device successively scans the N rows of sub pixels under the control of the second pulse signal, and writes a second data voltage into each row of sub pixels under the control of the second pulse signal during scanning of the sub pixels includes: In each of the n image display frames, the electronic device controls the DDIC to output the first start signal to the first group of shift registers, and the first group of shift registers scans each row of sub pixels in the N rows of sub pixels under the control of the first start signal. During scanning of each row of sub pixels, the electronic device controls the DDIC to output a first data signal to the data driver, and the data driver writes the second data voltage into the sub pixels under the control of the first data signal. That the electronic device does not scan the N rows of sub pixels under the control of the third pulse signal includes: After display of the n image display frames is completed, in each of the m image display frames, the electronic device controls the DDIC to output the second start signal to the first group of shift registers, and the first group of shift registers scans none of the N rows of sub pixels under the control of the second start signal.

In this implementation, in each of the n image display frames, the electronic device controls the DDIC to output the first start signal to the first group of shift registers, and the first group of shift registers scans each row of sub pixels in the N rows of sub pixels under the control of the first start signal. During scanning of each row of sub pixels, the electronic device controls the DDIC to output the first data signal to the data driver, and the data driver writes the second data voltage into the sub pixels under the control of the first data signal, so that the second screen can be controlled to be blank. After display of the n image display frames is completed, in each of the m image display frames, the electronic device controls the DDIC to output the second start signal to the first group of shift registers, and the first group of shift registers scans none of the N rows of sub pixels under the control of the second start signal, so that the second screen can be controlled to be blank.

In a possible implementation of the first aspect, the peripheral area is further provided with a second group of shift registers connected to the DDIC, and the second group of shift registers is connected to each row of sub pixels in the W rows of sub pixels and is configured to scan each row of sub pixels. W is a positive integer. The first pulse signal includes a third start signal, and that the electronic device successively scans all rows of sub pixels in the W rows of sub pixels under the control of the first pulse signal, and writes a first data voltage into each row of sub pixels under the control of the first pulse signal during scanning of the sub pixels includes: In each image display frame, the electronic device controls the DDIC to output the third start signal to the second group of shift registers, and the second group of shift registers scans each row of sub pixels in the W rows of sub pixels under the control of the third start signal. During scanning of each row of sub pixels, the electronic device controls the DDIC to output the second data signal to the data driver, and the data driver writes the first data voltage into the sub pixels under the control of the second data signal.

In this implementation, in each image display frame, the electronic device controls the DDIC to output the third start signal to the second group of shift registers, and the second group of shift registers scans each row of sub pixels in the W rows of sub pixels under the control of the third start signal. During scanning of each row of sub pixels, the electronic device controls the DDIC to output the second data signal to the data driver, and the data driver writes the first data voltage into the sub pixels under the control of the second data signal, so that the first screen can be controlled to be turned on.

In a possible implementation of the first aspect, the second pulse signal further includes a first clock signal, and the third pulse signal further includes a second clock signal; and the first clock signal and the second clock signal are used to control at least some of transistors on the second screen to be in a cut-off state.

In this implementation, the second pulse signal further includes the first clock signal, and the third pulse signal further includes the second clock signal; and the first clock signal and the second clock signal are used to control at least some of transistors on the second screen to be in the cut-off state, in other words, at least some of the transistors on the second screen do not work, so that power consumption can be reduced.

In a possible implementation of the first aspect, the method further includes: The electronic device outputs a fourth pulse signal to the foldable screen in response to a transition of the foldable screen from the folded state to the unfolded state. The foldable screen includes M rows of sub pixels, M is a positive integer, and M=W+N. The electronic device successively scans all rows of sub pixels in the M rows of sub pixels under the control of the fourth pulse signal, and writes a third data voltage into each row of sub pixels under the control of the fourth pulse signal during scanning of the sub pixels. The third data voltage is used to control the foldable screen to be turned on.

In this implementation, after the foldable screen is unfolded, the electronic device outputs the fourth pulse signal to the foldable screen, and the electronic device successively scans all the rows of sub pixels in the M rows of sub pixels under the control of the fourth pulse signal, and writes the third data voltage into each row of sub pixels under the control of the fourth pulse signal during scanning of the sub pixels, to control the foldable screen to be turned on.

In a possible implementation of the first aspect, the electronic device includes the display driver integrated circuit DDIC, the electronic device includes the display phase and the non-display phase in each image display frame, and that the electronic device outputs a fourth pulse signal to the foldable screen includes: After the foldable screen transitions from the folded state to the unfolded state, the electronic device delivers a third control command to the DDIC in the non-display phase in the first image display frame. The third control command is used to control the DDIC to output the fourth pulse signal to the foldable screen in the display phase in each image display frame.

In this implementation, the electronic device may deliver the third control command to the DDIC in the non-display phase in the first image display frame, to control the foldable screen to be turned on, thereby avoid affecting dynamic picture quality of the foldable screen.

According to a second aspect, an electronic device is provided. The electronic device has a function of implementing the method according to the first aspect, and the function may be implemented by hardware, or may be implemented by hardware by executing corresponding software. The hardware or the software includes one or more modules corresponding to the function.

According to a third aspect, an electronic device is provided. The electronic device includes a foldable screen, a memory, and one or more processors. The foldable screen is foldable to form at least two screens, the at least two screens include a first screen and a second screen, and when the foldable screen is in a folded state, the first screen and the second screen face away from each other. The foldable screen, the memory, and the processor are coupled to each other. The memory is configured to store computer program code, the computer program code includes computer instructions, and when the processor executes the computer instructions, the electronic device is enabled to perform the following steps: In response to a transition of the foldable screen from an unfolded state to the folded state, the electronic device outputs a first pulse signal to the first screen, and outputs a second pulse signal and a third pulse signal that periodically and alternately change to the second screen. The second pulse signal and the third pulse signal that periodically and alternately change are used to control a threshold voltage of a transistor on the second screen to remain within a preset range. The electronic device successively scans all rows of sub pixels in W rows of sub pixels under the control of the first pulse signal, and writes a first data voltage into each row of sub pixels under the control of the first pulse signal during scanning of the sub pixels. The first data voltage is used to control the first screen to be turned on. The electronic device successively scans N rows of sub pixels under the control of the second pulse signal, and writes a second data voltage into each row of sub pixels under the control of the second pulse signal during scanning of the sub pixels. The second data voltage is used to control the second screen to be blank. The electronic device does not scan the N rows of sub pixels under the control of the third pulse signal.

In a possible implementation of the third aspect, the electronic device includes a display driver integrated circuit DDIC; and when the processor executes the computer instructions, the electronic device is enabled to specifically perform the following steps: That the electronic device outputs a first pulse signal to the first screen, and outputs a second pulse signal and a third pulse signal that periodically and alternately change to the second screen includes: The electronic device controls the DDIC to output the first pulse signal to the first screen and output the second pulse signal and the third pulse signal that periodically and alternately change to the second screen.

In a possible implementation of the third aspect, the electronic device includes a display phase and a non-display phase in each image display frame; and when the processor executes the computer instructions, the electronic device is enabled to specifically perform the following steps: in the first image display frame in n image display frames, the electronic device delivers a first control command to the DDIC in the non-display phase. The first control command is used to control the DDIC to output the first pulse signal to the first screen and output the second pulse signal to the second screen in the display phase in the n image display frames. After display of the n image display frames is completed, in the first image display frame in m image display frames, the electronic device delivers a second control command to the DDIC in the non-display phase. The second control command is used to control the DDIC to output the first pulse signal to the first screen and output the third pulse signal to the second screen in the display phase in the m image display frames, and n and m are positive integers. The electronic device periodically delivers the first control command and the second control command to the DDIC, to control the DDIC to output the first pulse signal to the first screen and output the second pulse signal and the third pulse signal that alternately change to the second screen.

In a possible implementation of the third aspect, the foldable screen includes a display panel, the display panel has a display area and a peripheral area around the display area, the peripheral area is provided with a first group of shift registers and a data driver that are connected to the DDIC, and the first group of shift registers is connected to each row of sub pixels in the N rows of sub pixels and is configured to scan each row of sub pixels. N is a positive integer. The data driver is configured to provide a data voltage for each row of sub pixels during scanning of the sub pixels. The second pulse signal includes a first start signal, and the third pulse signal includes a second start signal. When the processor executes the computer instructions, the electronic device is enabled to specifically perform the following steps: In each of the n image display frames, the electronic device controls the DDIC to output the first start signal to the first group of shift registers, and the first group of shift registers scans each row of sub pixels in the N rows of sub pixels under the control of the first start signal. During scanning of each row of sub pixels, the electronic device controls the DDIC to output a first data signal to the data driver, and the data driver writes the second data voltage into the sub pixels under the control of the first data signal. That the electronic device does not scan the N rows of sub pixels under the control of the third pulse signal includes: After display of the n image display frames is completed, in each of the m image display frames, the electronic device controls the DDIC to output the second start signal to the first group of shift registers, and the first group of shift registers scans none of the N rows of sub pixels under the control of the second start signal.

In a possible implementation of the third aspect, the peripheral area is further provided with a second group of shift registers connected to the DDIC, and the second group of shift registers is connected to each row of sub pixels in the W rows of sub pixels and is configured to scan each row of sub pixels. W is a positive integer. The first pulse signal includes a third start signal, and when the processor executes the computer instructions, the electronic device is enabled to specifically perform the following steps: In each image display frame, the electronic device controls the DDIC to output the third start signal to the second group of shift registers, and the second group of shift registers scans each row of sub pixels in the W rows of sub pixels under the control of the third start signal. During scanning of each row of sub pixels, the electronic device controls the DDIC to output the second data signal to the data driver, and the data driver writes the first data voltage into the sub pixels under the control of the second data signal.

In a possible implementation of the third aspect, the second pulse signal further includes a first clock signal, and the third pulse signal further includes a second clock signal; and the first clock signal and the second clock signal are used to control at least some of transistors on the second screen to be in a cut-off state.

In a possible implementation of the third aspect, when the processor executes the computer instructions, the electronic device is enabled to further perform the following steps: The electronic device outputs a fourth pulse signal to the foldable screen in response to a transition of the foldable screen from the folded state to the unfolded state. The foldable screen includes M rows of sub pixels, M is a positive integer, and M=W+N. The electronic device successively scans all rows of sub pixels in the M rows of sub pixels under the control of the fourth pulse signal, and writes a third data voltage into each row of sub pixels under the control of the fourth pulse signal during scanning of the sub pixels. The third data voltage is used to control the foldable screen to be turned on.

In a possible implementation of the third aspect, the electronic device includes the display driver integrated circuit DDIC, the electronic device includes the display phase and the non-display phase in each image display frame, and when the processor executes the computer instructions, the electronic device is enabled to specifically perform the following steps: That the electronic device outputs a fourth pulse signal to the foldable screen includes: After the foldable screen transitions from the folded state to the unfolded state, the electronic device delivers a third control command to the DDIC in the non-display phase in the first image display frame. The third control command is used to control the DDIC to output the fourth pulse signal to the foldable screen in the display phase in each image display frame.

According to a fourth aspect, a chip system is provided. The chip system includes at least one processor and at least one interface circuit. The processor and the interface circuit are interconnected by using a line. The processor is configured to run computer instructions, to implement the method according to any one of the first aspect or the implementations of the first aspect.

According to a fifth aspect, a computer-readable storage medium is provided. The computer-readable storage medium stores instructions. When the instructions are run on a computer, the computer is enabled to perform the method according to any one of the implementations of the first aspect.

According to a sixth aspect, a computer program product including instructions is provided. When the computer program product runs on a computer, the computer is enabled to perform the method according to any one of the implementations of the first aspect.

For technical effects brought by any one of design manners in the second aspect to the sixth aspect, refer to the technical effects brought by different design manners in the first aspect. Details are not described herein again.

DESCRIPTION OF EMBODIMENTS

To make a person skilled in the art better understand the technical solutions in the embodiments of this application, the following clearly describes the technical solutions in the embodiments of this application with reference to the accompanying drawings in the embodiments of this application. Clearly, the described embodiments are merely some rather than all of the embodiments of this application. Based on the embodiments of this application, all other embodiments obtained by a person skilled in the art without creative efforts shall fall within the protection scope of this application.

In the following descriptions, the terms "first" and "second" are used merely for the purpose of description, and shall not be construed as indicating or implying relative importance or implicitly indicating the number of indicated technical features. Therefore, a feature defined with "first" or "second" may explicitly or implicitly include one or more such features. In the descriptions of the embodiments of this application, unless otherwise specified, "a plurality of" means two or more.

In descriptions of some embodiments, expressions "coupled" and "connected" and derivatives thereof may be used. For example, the term "connected" may be used in descriptions of some embodiments to indicate that two or more components are in direct physical or electrical contact with each other. For another example, the term "coupled" may be used in descriptions of some embodiments to indicate that two or more components are in direct physical or electrical contact with each other. However, the term "coupled" or "communicatively coupled (communicatively coupled)" may alternatively indicate that two or more components are not in direct contact with each other, but still cooperate or interact with each other. The embodiments disclosed herein are not necessarily limited by the content herein.

An embodiment of this application provides an electronic device. The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/a virtual reality (virtual reality, VR) device, or the like that includes the foregoing foldable screen. A specific form of the electronic device is not specially limited in this embodiment of this application.

Figure 1:
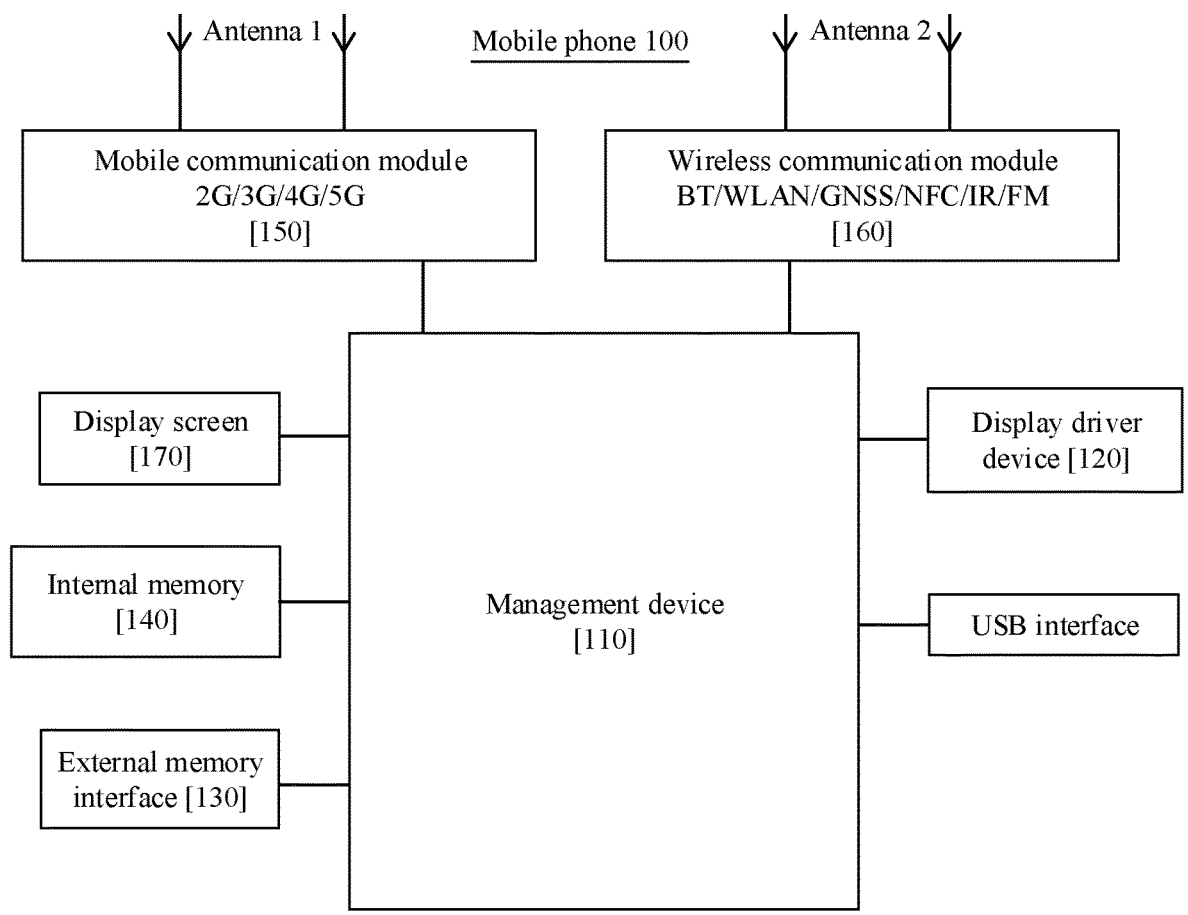
FIG. 1 is a schematic diagram of a hardware structure of a mobile phone according to an embodiment of this application.

As shown in FIG. 1, the electronic device in this embodiment of this application may be a mobile phone 100. The following uses the mobile phone 100 as an example to describe this embodiment of this application in detail. It should be understood that the mobile phone 100 shown in the figure is merely an example of the electronic device, and the mobile phone 100 may include more or fewer components than those shown in the figure, or may combine two or more components, or may have different component configurations.

As shown in FIG. 1, the mobile phone 100 may specifically include a management device 110, a display driver device 120, an external memory interface 130, an internal memory 140, a universal serial bus (universal serial bus, USB) interface, an antenna 1, an antenna 2, a mobile communication module 150, a wireless communication module 160, a display screen (namely, a foldable screen) 170, and the like.

The management device 110 is a control center of the electronic device 100, and may control the electronic device 100 to perform various functions and data processing. For example, the management device 110 may be a chip with a memory. For example, the management device 110 may be a system on chip (system on chip, SoC).

In some embodiments, the management device 110 may include a processor. The processor may be a central processing unit (central processing unit, CPU), and the processor may include one or more processing units. For example, the processor may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor to store instructions and data. In some embodiments, the memory in the processor is a cache. The memory may store instructions or data just used or cyclically used by the processor. If the processor needs to use the instructions or the data again, the processor may directly invoke the instructions or the data from the memory. This avoids repeated access and reduces a waiting time of the processor, thereby improving system efficiency.

In some embodiments, the processor may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in this embodiment of this application is merely an example for description, and does not constitute a limitation on the structure of the mobile phone 100. In some other embodiments, an interface connection manner different from that in the foregoing embodiment or a combination of a plurality of interface connection manners may be used for the mobile phone 100.

The display driver device 120 is a control center of the display screen 170, and may control the display screen (namely, the foldable screen) 170 to display various image data. For example, the display driver device 120 may be a chip with a memory. For example, the display driver device 120 may be a display driver integrated circuit (display driver integrated circuit, DDIC). A function of the display driver integrated circuit is to provide information about various displayed pictures to the display screen (namely, the foldable screen) 170 after the display driver integrated circuit is powered on.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution for wireless communication that is applied to the mobile phone 100 and that includes 2G/3G/4G/5G and the like. The mobile communication module 150 may include at least one filter, switch, power amplifier, low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert, by using the antenna 1, an amplified signal into an electromagnetic wave for radiation. In some embodiments, at least some functional modules of the mobile communication module 150 may be disposed in the processor. In some embodiments, at least some functional modules of the mobile communication module 150 may be disposed in a same device as at least some modules of the processor.

The wireless communication module 160 may provide a solution for wireless communication that is applied to the mobile phone 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor. The wireless communication module 160 may further receive a to-be-sent signal from the processor, perform frequency modulation and amplification on the signal, and convert the signal into an electromagnetic wave for radiation through the antenna 2.

In some embodiments, in the mobile phone 100, the antenna 1 is coupled to the mobile communication module 150, and the antenna 2 is coupled to the wireless communication module 160, so that the mobile phone 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The external memory interface 130 may be configured to connect to an external memory card such as a Micro SD card, to extend a storage capability of the mobile phone 100. The external memory card communicates with the processor by using the external memory interface 130, to implement a data storage function, for example, to store files such as music and a video in the external memory card.

The internal memory 140 may be configured to store computer-executable program code, and the executable program code includes instructions. The processor runs the instructions stored in the internal memory 140, to perform various function applications and data processing of the mobile phone 100. The internal memory 140 may include a program storage area and a data storage area. The program storage area may store an operating system, an application required by at least one function (for example, a sound playing function or an image playing function), and the like. The data storage area may store data (for example, audio data or a phone book) and the like created during use of the mobile phone 100. In addition, the internal memory 130 may include a high-speed random access memory, and may further include a non-volatile memory, for example, at least one magnetic disk storage device, a flash memory device, or a universal flash storage (UFS).

The display screen 170 is configured to display an image, a video, and the like, and the display screen 170 may be the foregoing foldable screen. The foldable screen is foldable to form at least two screens. For example, the foldable screen is foldable along a folding edge or a folding shaft to form a first screen and a second screen, in other words, the at least two screens include the first screen and the second screen.

There may be two types of foldable screens. One type of foldable screen is a foldable screen folded outward (briefly referred to as an outward foldable screen), and the other type of foldable screen is a foldable screen folded inward (briefly referred to as an inward foldable screen). In an example in which the foldable screen is foldable to form the first screen and the second screen, after the outward foldable screen is folded, the first screen and the second screen face away from each other, and after the inward foldable screen is folded, the first screen and the second screen face each other.

Figure 2:
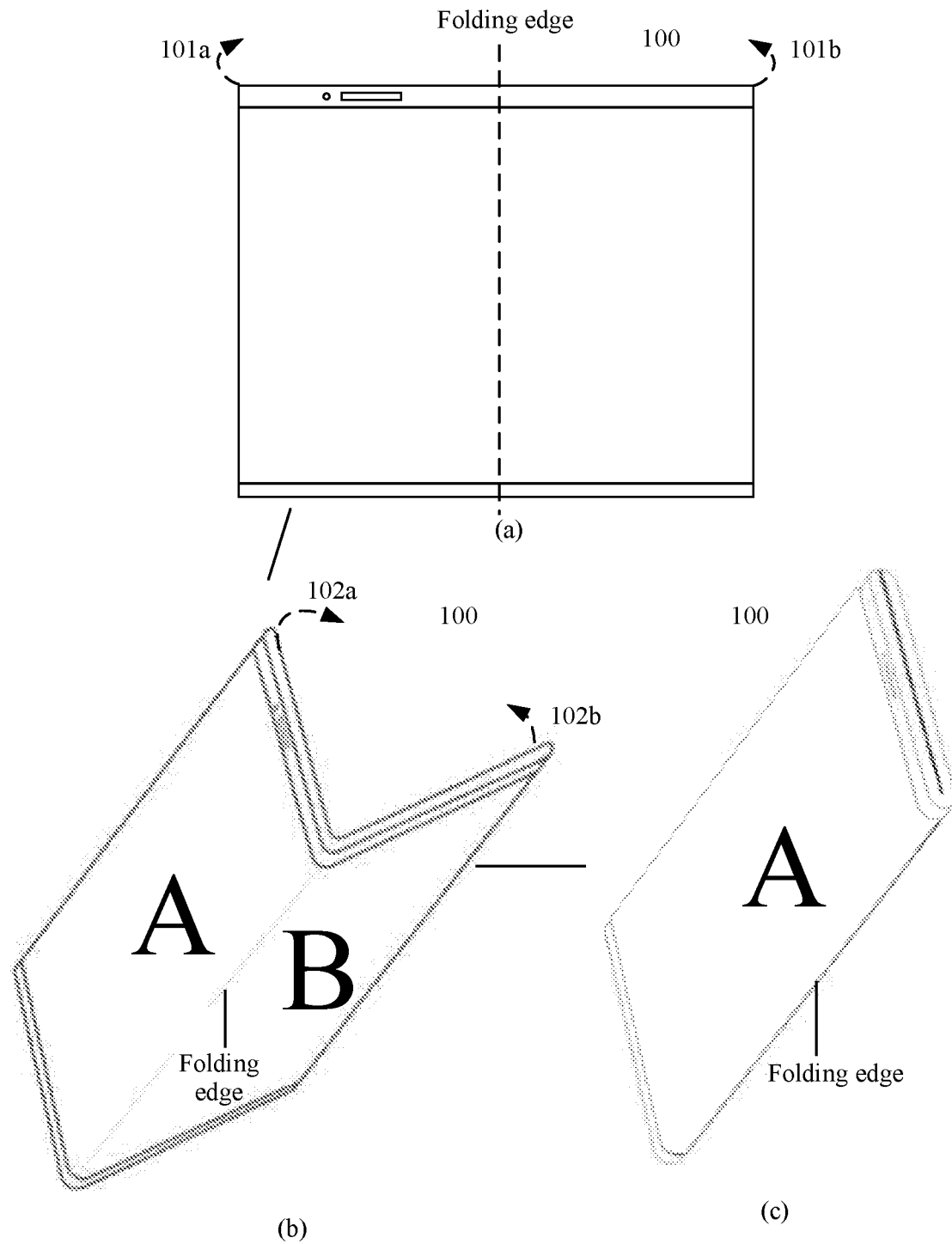
FIG. 2 is a schematic diagram of an outward foldable screen according to an embodiment of this application.

For example, referring to FIG. 2, FIG. 2 is a schematic diagram of a product form of a mobile phone 100 with an outward foldable screen according to an embodiment of this application. (a) in FIG. 2 is a schematic diagram of a form existing when the outward foldable screen is fully unfolded. The outward foldable screen may be folded along a folding edge in directions 101*a* and 101*b* shown in (a) in FIG. 2, to form a screen A (namely, a first screen) and a screen B (namely, a second screen) shown in (b) in FIG. 2. The outward foldable screen may be further folded along the folding edge in directions 102*a* and 102*b* shown in (b) in FIG. 2, to form an outward-folded foldable screen in a folded state shown in (c) in FIG. 2. As shown in (c) in FIG. 2, after the foldable screen of the mobile phone 100 is fully folded, the screen A and the screen B face away from each other, and are visible to a user.

It may be understood that for the mobile phone with the outward foldable screen, when the foldable screen is in the folded state, a picture may be displayed on the first screen or the second screen; or when the foldable screen is in an unfolded state, a picture may be displayed on the first screen and the second screen.

The display screen 170 includes a display panel. The display panel may be a liquid crystal display (LCD), an organic light-emitting diode (OLED), an active-matrix organic light emitting diode (AMOLED), a flexible light-emitting diode (FLED), a Mini-LED, a Micro-LED, a Micro-OLED, a quantum dot light emitting diode (QLED), or the like. This is not limited in this embodiment of this application.

The following embodiments of this application provide descriptions by using an example in which the display panel is an organic light-emitting diode OLED display panel.

Figure 3:
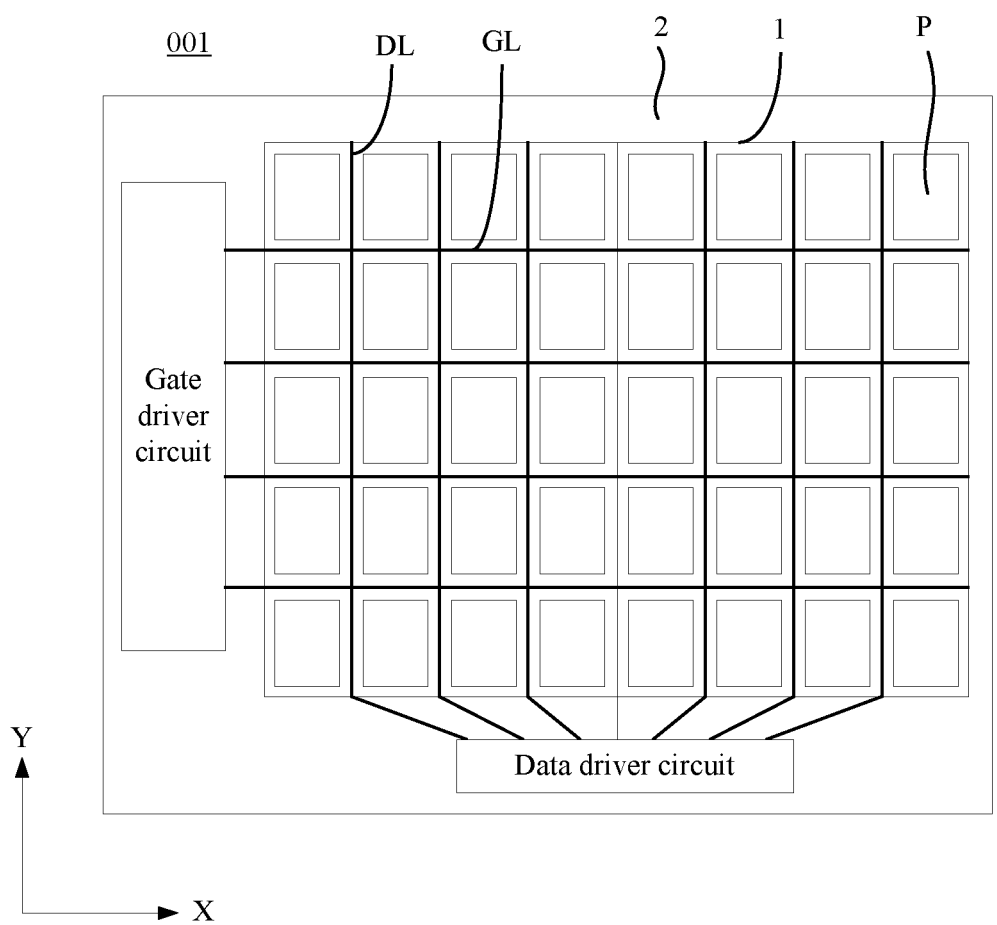
FIG. 3 is a schematic diagram 1 of a structure of a display panel according to an embodiment of this application.

In some embodiments, as shown in FIG. 3, the foregoing display panel 001 includes a display area (active area, AA) 1, which is briefly referred to as an AA area and may also be referred to as an active display area, and a peripheral area disposed around at least one side of the display area.

The display panel 001 includes sub pixels (sub pixel) P of a plurality of colors in the display area, and the sub pixels of the plurality of colors include at least a sub pixel of a first color, a sub pixel of a second color, and a sub pixel of a third color. The first color, the second color, and the third color may be three primary colors (for example, red, green, and blue).

For ease of description, an example in which the plurality of sub pixels P are arranged in a form of a matrix is used for description in this application. In this case, sub pixels P arranged in a line in a horizontal direction X are referred to as a same row of sub pixels, and sub pixels P arranged in a line in a vertical direction Y are referred to as a same column of sub pixels.

As shown in FIG. 3, a gate driver circuit (also referred to as a gate driver) and a data driver circuit (also referred to as a data driver) are disposed in the peripheral area of the display panel 001. In some embodiments, the gate driver circuit may be disposed on a side edge in an extension direction of a gate line (gate line, GL), and the data driver circuit may be disposed on a side edge in an extension direction of a data line (data line, DL). A pixel circuit is disposed in each sub pixel P (each row/column of pixels P), pixel circuits in a same row are connected to a same gate line GL, and pixel circuits in a same column are connected to a same data line DL.

For example, the display panel 001 includes a plurality of rows of sub pixels, and pixel circuits in each row of sub pixels are connected to one gate line GL, in other words, the display panel 001 includes a plurality of gate lines GLs. Correspondingly, the display panel 001 includes a plurality of columns of sub pixels, and pixel circuits in each column of sub pixels are connected to one data line DL, in other words, the display panel 001 includes a plurality of data lines DLs. On the basis of this, the gate driver circuit may drive the plurality of gate lines to scan each row of sub pixels in the plurality of rows of sub pixels, and when the gate driver circuit scans each row of sub pixels, the data driver circuit provides a data voltage for pixel circuits by using the data line DL, to drive the pixel circuits in the display panel 001.

It may be understood that each pixel circuit is electrically connected to one light emitting device, and is configured to drive the light emitting device to emit light. Therefore, the pixel circuit is driven to drive the light emitting device to emit light, so that a corresponding sub pixel P is displayed, thereby implementing display of the display panel 001.

In some embodiments, the gate driver circuit may be a gate driver IC (which may also be referred to as a gate IC). For example, the gate driver circuit may be a GOA circuit, or may be an emission driver on array (emission driver on array, EOA) circuit.

In addition, in some embodiments, the gate driver circuit may be disposed on one side of the peripheral area of the display panel 001, and the gate lines GLs are successively driven row by row from the one side, in other words, one-side driving is performed. In some other embodiments, in the display panel 001, gate driver circuits may be respectively disposed on two opposite side edges in the extension direction of the gate line GL in the peripheral area, and the gate lines GLs may be successively driven row by row from two edges by using the gate driver circuits on two sides, in other words, two-edge simultaneous driving is performed. In some other embodiments, in the display panel 001, gate driver circuits may be respectively disposed on two opposite side edges in the extension direction of the gate line GL in the peripheral area, and the gate lines GLs may be alternately successively driven row by row from two edges by using the gate driver circuits on two sides, in other words, two-edge alternate driving is performed. For example, a gate driver circuit on one side may be connected to an odd-numbered row of gate lines GLs, and a gate driver circuit on the other side may be connected to an even-numbered row of gate lines GLs. This is not limited.

Figure 4:
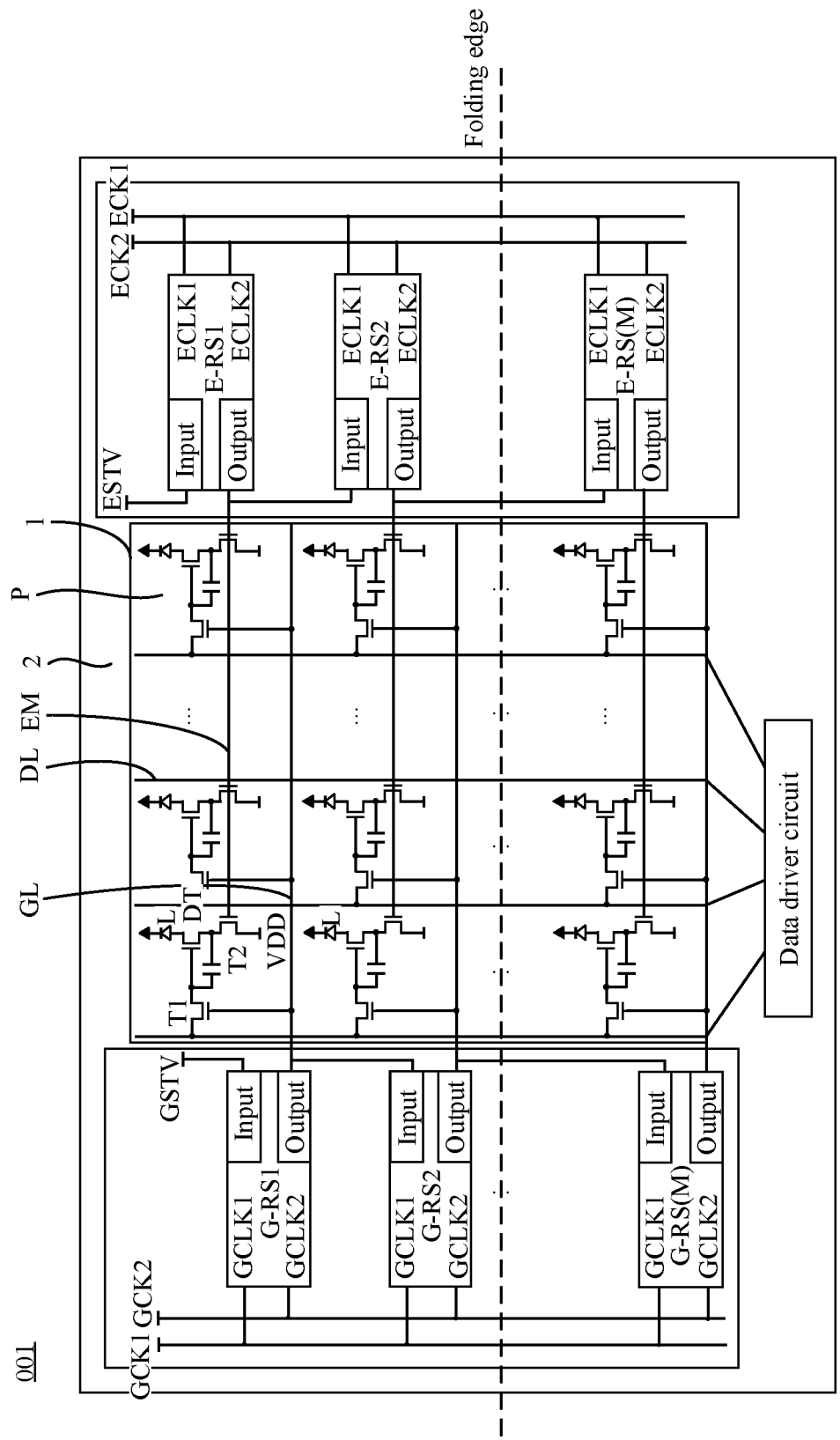
FIG. 4 is a schematic diagram 2 of a structure of a display panel according to an embodiment of this application.

Two-edge simultaneous driving is used as an example. For example, as shown in FIG. 4, in the display panel 001, the gate driver circuit on one side may be a GOA circuit, and the gate driver circuit on the other side may be an EOA circuit. The GOA circuit includes M stages of cascaded shift registers (G-RS1, G-RS2, . . . , and G-RS(M)), and the M stages of cascaded shift registers are respectively connected to M gate lines (GL1, GL2, . . . , and GL(M)) in one-to-one correspondence. Correspondingly, the EOA circuit includes M stages of cascaded shift registers (E-RS1, E-RS2, . . . , and E-RS(M)), and the M stages of cascaded shift registers are respectively connected to M EM lines (EM1, EM2, . . . , and EM(M)) in one-to-one correspondence. M is a positive integer.

It may be understood that a pixel circuit disposed in each sub pixel P (each row/column of sub pixels P) includes a plurality of transistors T, and the plurality of transistors T are connected to each other to drive the light emitting device to emit light. An example in which the pixel circuit includes three transistors (for example, a transistor T1, a transistor T2, and a driver transistor DT) is used for illustration. For example, as shown in FIG. 4, a gate of the transistor T1 is connected to the gate line GL, a first electrode (for example, a source) of the transistor T1 is connected to the data line DL, and a second electrode (for example, a drain) of the transistor T1 is connected to a gate of the driver transistor DT. A gate of the transistor T2 is connected to the EM line, a first electrode (for example, a source) of the transistor T2 is connected to a supply voltage terminal VDD, a second electrode (for example, a drain) of the transistor T2 is connected to a first electrode (for example, a source) of the driver transistor DT, and a second electrode (for example, a drain) of the driver transistor DT is connected to the light emitting device L.

Still as shown in FIG. 4, for the shift registers (G-RS1, G-RS2, . . . , and G-RS(M)) in the GOA circuit, an output terminal Output of the shift register G-RS is connected to the gate line GL (that is, a gate of a transistor T1 of each pixel circuit), to output, through the output terminal Output, a scan signal (for example, output a gating signal Gate) to the gate line GL connected to the shift register G-RS. Clock signal terminals (for example GCLK1 and GCLK2) are further disposed in the shift register G-RS, and clock signal lines (for example, GCK1 and GCK2) are further disposed in the peripheral area on a side edge in the display panel 001. In some embodiments, the display panel 001 further includes a clock controller TCON (not shown in the figure). One terminal of the clock signal line GCK1 is connected to the clock signal terminal GCLK1, and the other terminal thereof is connected to the TCON. Correspondingly, one terminal of the clock signal line GCK2 is connected to the clock signal terminal GCLK2, and the other terminal thereof is connected to the TCON. On the basis of this, clock signals input by the TCON through the clock signal line GCK1 and the clock signal line GCK2 control the output terminal Output of the shift register G-RS in the GOA circuit to output the scan signal, to successively scan all rows of sub pixels in M rows of sub pixels row by row.

Certainly, it may be understood that another control-type clock signal line may be further disposed in the peripheral area on the side edge in the display panel 001. A clock signal provided by the control-type clock signal line is not used to provide a scan signal. The control-type clock signal line is also connected to the TCON and the clock signal terminal of the shift register, to provide a related control-type clock signal by using the TCON and perform related control on the shift register. In other words, the clock signal line involved in this application is not limited to a clock signal line that provides a scan signal, and may also include another control-type clock signal line connected to the shift register G-RS in the GOA circuit. This is not limited in this application.

In some embodiments, a cascading structure of the stages of shift registers G-RSs in the GOA circuit may be, for example, as follows: An input terminal Input of the first-stage shift register G-RS1 is connected to a start signal terminal GSTV, and is configured to receive a start signal. An input terminal Input of a shift register other than the first-stage shift register G-RS1 is connected to an output terminal Output of a previous-stage shift register.

Still as shown in FIG. 4, for the shift registers (E-RS1, E-RS2, . . . , and E-RS(M)) in the EOA circuit, an output terminal Output of the shift register E-RS is connected to the EM line (that is, a gate of a transistor T2 of each pixel circuit), to output, through the output terminal Output, a scan signal (for example, output an enable signal EM) to the EM line connected to the shift register E-RS. Clock signal terminals (for example ECLK1 and ECLK2) are further disposed in the shift register E-RS, and clock signal lines (for example, ECK1 and ECK2) are further disposed in the peripheral area on the side edge in the display panel 001. In some embodiments, one terminal of the clock signal line ECK1 is connected to the clock signal terminal ECLK1, and the other terminal thereof is connected to the TCON. Correspondingly, one terminal of the clock signal line ECK2 is connected to the clock signal terminal ECLK2, and the other terminal thereof is connected to the TCON. Clock signals input by the TCON through the clock signal line ECK1 and the clock signal line ECK2 control the output terminal Output of the shift register E-RS in the EOA circuit to output the scan signal, to successively scan all the rows of sub pixels in the M rows of sub pixels row by row.

Certainly, the shift register E-RS in the EOA circuit may be further connected to another control-type clock signal line. For details, refer to the foregoing descriptions. Details are not described herein again.

In some embodiments, a cascading structure of the stages of shift registers E-RSs in the EOA circuit may be, for example, as follows: An input terminal Input of the first-stage shift register E-RS1 is connected to a start signal terminal ESTV, and is configured to receive a start signal. An input terminal Input of a shift register other than the first-stage shift register E-RS1 is connected to an output terminal Output of a previous-stage shift register.

In this way, the first-stage shift register G-RS1 in the GOA circuit is controlled by the start signal received by the start signal terminal GSTV, and each stage of shift register G-RS receives clock signals input by the TCON through the clock signal line GCK1 and the clock signal line GCK2 to control an output terminal Output of the stage of shift register G-RS to output a scan signal, to successively scan all the rows of sub pixels in the M rows of sub pixels row by row. The data driver circuit provides a data voltage for each row of sub pixels during scanning of the sub pixels. Under the control of the scan signal (for example, a gating signal Gate), the transistor T1 is conducted, and the data driver circuit writes the data voltage into the gate of the driver transistor DT.

Correspondingly, the first-stage shift register E-RS1 in the EOA circuit is controlled by the start signal received by the start signal terminal ESTV, and each stage of shift register E-RS receives clock signals input by the TCON through the clock signal line ECK1 and the clock signal line ECK2 to control an output terminal Output of the stage of shift register E-RS to output a scan signal, to successively scan all the rows of sub pixels in the M rows of sub pixels row by row. Under the control of the scan signal (for example, an enable signal EM), the transistor T2 is conducted, and a supply voltage of the supply voltage terminal VDD is written into the source of the driver transistor. On the basis of this, the light emitting device L can be controlled, by using a current flowing through the driver transistor DT, to emit light.

For example, the current flowing through the driver transistor DT meets the following formula: $I=k(V_{gs}-V_{th})=k(V_{data}-V_{dd}-V_{th})^2$.

I is the current of the driver transistor DT, k is an intrinsic conductivity factor of the driver transistor DT, $V_{gs}$ is a gate-source voltage difference of the driver transistor DT, $V_{th}$ is a threshold voltage of the driver transistor DT, $V_{data}$ is the data voltage, and $V_{dd}$ is the supply voltage.

However, for a foldable screen of this application, when the foldable screen is in a folded state, a picture may be displayed on a first screen, and no picture may be displayed on a second screen, in other words, the first screen is turned on, and the second screen is blank. In some embodiments, a blank data voltage is written into each sub pixel in a display panel in an area corresponding to the second screen, so that a grayscale displayed on the sub pixel is L0, to control the second screen to be blank.

Based on the structures of the shift register G-RS and the shift register E-RS shown in the foregoing embodiment, an embodiment of this application provides a shift register driving method, to control the second screen to be blank.

It should be noted that in this application, transistors used in the shift register may be thin film transistors (thin film transistor, TFT), or may be metal oxide semiconductors (metal oxide semiconductor, MOS), or may be transistors with a same characteristic. This is not limited in this application. In addition, the transistor used in the shift register in this application may be an N-type transistor or a P-type transistor, or may be an enhancement-type transistor or a depletion-type transistor. For ease of description, an example in which the transistor is a P-type transistor is used in the following embodiments.

In addition, the P-type transistor is active at a low level and inactive at a high level, and the N-type transistor is active at a high level and inactive at a low level. In this case, when the transistor in this application is a P-type transistor, an active level described in this application is a low level, and when the transistor in this application is an N-type transistor, the active level in this application is a high level. It may be understood that an example in which the P-type transistor is active at a low level is used in each of timing diagrams in this application.

With reference to the structure of the display panel 001 shown in FIG. 4, when the display panel 001 includes M rows of sub pixels, the shift register successively scans all rows of sub pixels in the M rows of sub pixels from top to bottom. On the basis of this, as shown in FIG. 4, when the foldable screen is folded, along a folding shaft, into two screens, for example, an upper half screen (for example, the first screen) and a lower half screen (for example, the second screen), the first screen may include, for example, W rows of sub pixels, and the second screen may include, for example, N rows of sub pixels. M, W, and N are positive integers, and M=W+N.

For example, the upper half screen (for example, the first screen) is turned on, and the lower half screen (for example, the second screen) is blank. When the shift register scans each row of sub pixels on the upper half screen (namely, the first screen), the data driver circuit writes a normal data voltage into the sub pixels, to control the upper half screen (namely, the first screen) to be turned on. Correspondingly, when the shift register scans each row of sub pixels on the lower half screen (namely, the second screen), the data driver circuit writes a blank data voltage into the sub pixels, so that a grayscale displayed on the sub pixels is L0, to control the second screen to be blank.

Figure 5:
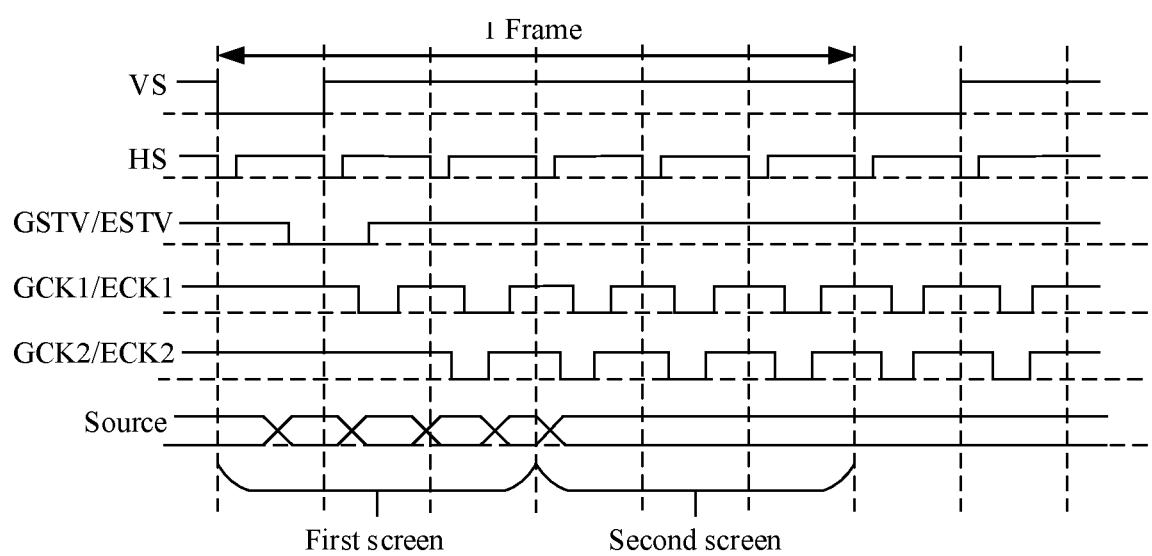
FIG. 5 is a timing diagram 1 of driving display of a foldable screen according to an embodiment of this application.

Further, with reference to the structure of the shift register G-RS and the structure of the shift register E-RS shown in FIG. 4, referring to FIG. 5, FIG. 5 is a timing diagram of a shift register. For example, as shown in FIG. 5, in an image display frame (1 Frame), a start signal received by a start signal terminal GSTV of the shift register G-RS is at a low level. In this case, under the control of low-level clock signals input by the TCON through the clock signal lines GCK1 and GCK2, an output terminal Output of the shift register in the GOA circuit is controlled to output a scan signal, to scan each row of sub pixels in the M rows of sub pixels included in the first screen. During scanning of each row of sub pixels in the W rows of sub pixels, the data driver circuit writes a data voltage Vdata into the sub pixels under the control of a low-level data signal Source input by the TCON through the data line DL. During scanning of each row of sub pixels in the N rows of sub pixels included in the second screen, the data driver circuit writes a blank data voltage into the sub pixels under the control of a high-level data signal Source input by the TCON through the data line DL.

Correspondingly, in an image display frame, a start signal received by the start signal terminal ESTV of the shift register E-RS is at a low level. In this case, under the control of low-level clock signals input by the TCON through the clock signal lines ECK1 and ECK2, the output terminal Output of the shift register in the EOA circuit is controlled to output a scan signal, to successively scan all the rows of sub pixels in the M rows of sub pixels. During scanning of each row of sub pixels in the W rows of sub pixels included in the first screen, the light emitting device L is controlled, based on a data voltage Vdata written into the sub pixels, to emit light, and a corresponding grayscale is displayed, to control the first screen to be turned on. During scanning of each row of sub pixels in the N rows of sub pixels included in the second screen, the light emitting device L is controlled, based on a blank data voltage written into the sub pixels, to emit light, and a grayscale L0 is displayed, to control the second screen to be blank.

Still as shown in FIG. 5, the timing diagram further includes a vertical synchronization signal (V_sync or VS) and a horizontal synchronization signal (H_sync or HS). The vertical synchronization signal is used to perform synchronization on each image display frame. When each image display frame starts, the shift register receives a vertical synchronization signal, indicating that the image display frame has started. Correspondingly, the horizontal synchronization signal is used to perform synchronization on scanning of each row of sub pixels. During scanning of each row of sub pixels, the shift register receives a horizontal synchronization signal, indicating that scanning of the row of sub pixels has started.

Based on the foregoing driving method, to reduce power consumption, in some embodiments, the GOA circuit and the EOA circuit in the display panel 001 are opened at a position of the folding shaft. After the foldable screen is folded, in a display panel in an area corresponding to the second screen, the start signal received by the start signal terminal GSTV of the shift register G-RS in the GOA circuit is set to a high level. Correspondingly, the start signal received by the start signal terminal ESTV of the shift register E-RS in the EOA circuit is also set to a high level. In this way, because the start signal received by the start signal terminal GSTV is at a high level, the GOA circuit and the EOA circuit can scan none of the N rows of sub pixels included in the second screen, the data voltage provided by the data driver circuit cannot be written into the sub pixels, and therefore, the light emitting device L cannot be controlled to emit light, so that power consumption can be reduced while the second screen is controlled to be blank.

It may be understood that the active level in this application is a low level, and correspondingly, an inactive level is a high level. That the start signal is set to a high level means that the start signals received by the start signal terminal GSTV and the start signal terminal ESTV are pulled high (pull high).

Figure 6:
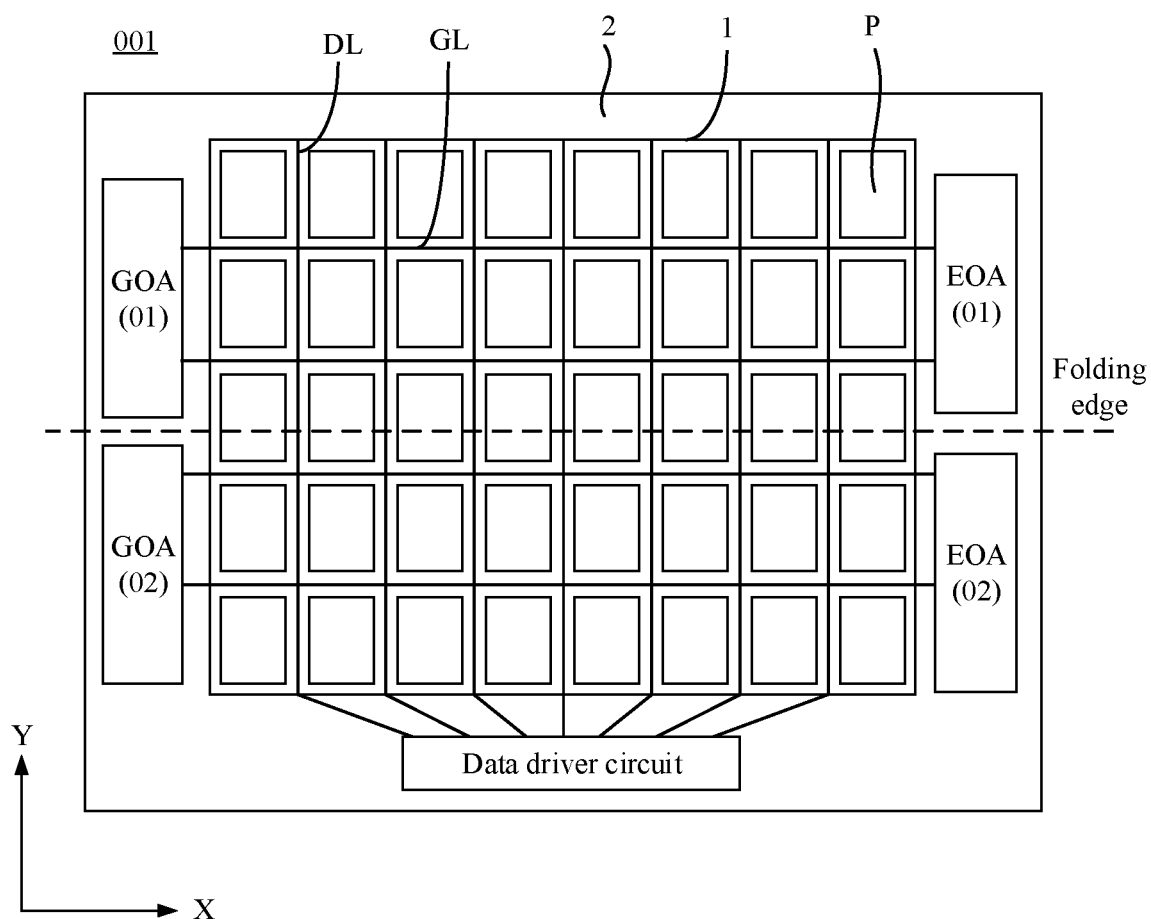
FIG. 6 is a schematic diagram 3 of a structure of a display panel according to an embodiment of this application.

In some embodiments, as shown in FIG. 6, in the display panel 001, gate driver circuits on one side include a GOA(01) circuit and a GOA(02) circuit, and gate driver circuits on the other side include an EOA(01) circuit and an EOA(02) circuit. The GOA(01) circuit and the EOA(01) circuit are configured to drive a pixel circuit in each sub pixel on the first screen, and the GOA(02) circuit and the EOA(02) circuit are configured to drive a pixel circuit in each sub pixel on the second screen.

Figure 7:
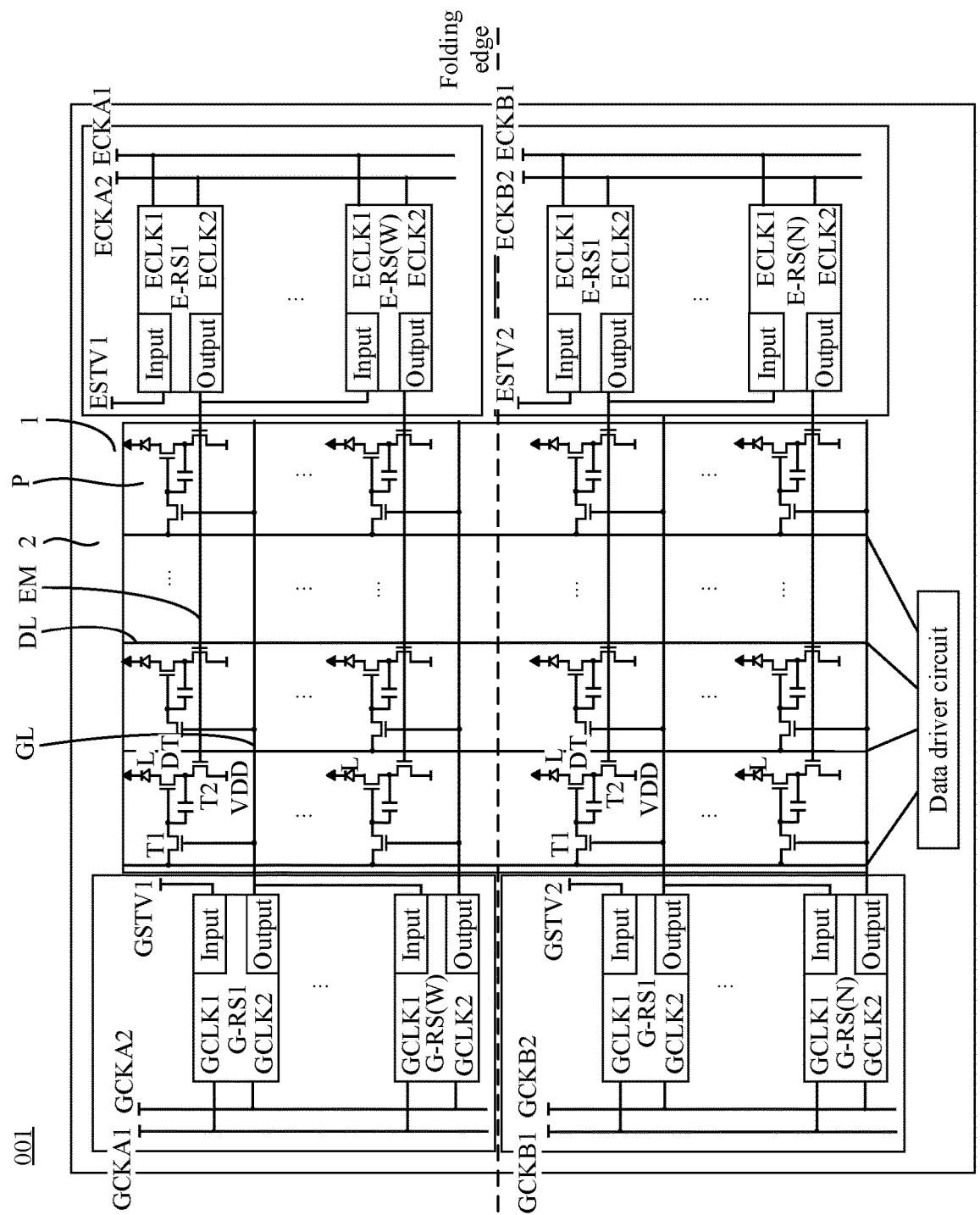
FIG. 7 is a schematic diagram 4 of a structure of a display panel according to an embodiment of this application.

For example, as shown in FIG. 7, the GOA(01) circuit includes W stages of cascaded shift registers (G-RS1, G-RS2, . . . , and G-RS(W)), and the W stages of cascaded shift registers are respectively connected to W gate lines (GL1, GL2, . . . , and GL(W)) in the first screen in one-to-one correspondence. The GOA(02) circuit includes N stages of cascaded shift registers (G-RS1, G-RS2, . . . , and G-RS(N)), and the N stages of cascaded shift registers are respectively connected to N gate lines (GL1, GL2, . . . , and GL(N)) in the second screen in one-to-one correspondence. Correspondingly, the EOA(01) circuit includes W stages of cascaded shift registers (E-RS1, E-RS2, . . . , and E-RS(W)), and the W stages of cascaded shift registers are respectively connected to W EM lines (EM1, EM2, . . . , and EM(W)) in the first screen in one-to-one correspondence. The EOA(02) circuit includes N stages of cascaded shift registers (E-RS1, E-RS2, . . . , and E-RS(N)), and the N stages of cascaded shift registers are respectively connected to N EM lines (EM1, EM2, . . . , and EM(N)) in the second screen in one-to-one correspondence.

In some embodiments, still as shown in FIG. 7, a cascading structure of the stages of shift registers G-RSs in the GOA(01) circuit may be as follows: An input terminal Input of the first-stage shift register G-RS1 is connected to a start signal terminal GSTV1, and is configured to receive a start signal. An input terminal Input of a shift register other than the first-stage shift register G-RS1 is connected to an output terminal Output of a previous-stage shift register. Correspondingly, a cascading structure of the stages of shift registers G-RSs in the GOA(02) circuit may be as follows: An input terminal Input of the first-stage shift register G-RS1 is connected to a start signal terminal GSTV2, and is configured to receive a start signal. An input terminal Input of a shift register other than the first-stage shift register G-RS1 is connected to an output terminal Output of a previous-stage shift register.

Similarly, as shown in FIG. 7, a cascading structure of the stages of shift registers E-RSs in the EOA(01) circuit may be, for example, as follows: An input terminal Input of the first-stage shift register E-RS1 is connected to a start signal terminal ESTV1, and is configured to receive a start signal. An input terminal Input of a shift register other than the first-stage shift register E-RS1 is connected to an output terminal Output of a previous-stage shift register. Correspondingly, a cascading structure of the stages of shift registers E-RSs in the EOA(02) circuit may be, for example, as follows: An input terminal Input of the first-stage shift register E-RS1 is connected to a start signal terminal ESTV2, and is configured to receive a start signal. An input terminal Input of a shift register other than the first-stage shift register E-RS1 is connected to an output terminal Output of a previous-stage shift register.

In some embodiments, still as shown in FIG. 7, for the shift registers (G-RS1, G-RS2, . . . , and G-RS(W)) in the GOA(01) circuit, clock signal terminals (GCLK1 and GCLK2) are further disposed in the shift register G-RS, and clock signal lines (for example, GCKA1 and GCKA2) are further disposed in the peripheral area on a sidewall in the display panel 001. For example, one terminal of the clock signal line GCKA1 is connected to the clock signal terminal GCLK1, and the other terminal thereof is connected to the TCON. Correspondingly, one terminal of the clock signal line GCKA2 is connected to the clock signal terminal GCLK2, and the other terminal thereof is connected to the TCON. On the basis of this, clock signals input by the TCON through the clock signal line GCKA1 and the clock signal line GCKA2 control the output terminal Output of the shift register in the GOA(01) circuit to output a scan signal, to successively scan all the rows of sub pixels in the W rows of sub pixels.

Correspondingly, for the shift registers (G-RS1, G-RS2, . . . , and G-RS(N)) in the GOA(02) circuit, clock signal terminals (GCLK1 and GCLK2) are further disposed in the shift register G-RS, and clock signal lines (for example, GCKB1 and GCKB2) are further disposed in the peripheral area on the sidewall in the display panel 001. For example, one terminal of the clock signal line GCKB1 is connected to the clock signal terminal GCLK1, and the other terminal thereof is connected to the TCON. Correspondingly, one terminal of the clock signal line GCKB2 is connected to the clock signal terminal GCLK2, and the other terminal thereof is connected to the TCON. On the basis of this, clock signals input by the TCON through the clock signal line GCKB1 and the clock signal line GCKB2 control the output terminal Output of the shift register in the GOA(02) circuit to output a scan signal, to successively scan all the rows of sub pixels in the N rows of sub pixels.

Similarly, still as shown in FIG. 7, for the shift registers (E-RS1, E-RS2, . . . , and E-RS(W)) in the EOA(01) circuit, clock signal terminals (ECLK1 and ECLK2) are further disposed in the shift register G-RS, and clock signal lines (for example, ECKA1 and ECKA2) are further disposed in the peripheral area on the sidewall in the display panel 001. For example, one terminal of the clock signal line ECKA1 is connected to the clock signal terminal ECLK1, and the other terminal thereof is connected to the TCON. Correspondingly, one terminal of the clock signal line ECKA2 is connected to the clock signal terminal ECLK2, and the other terminal thereof is connected to the TCON. On the basis of this, clock signals input by the TCON through the clock signal line ECKA1 and the clock signal line ECKA2 control the output terminal Output of the shift register in the EOA(01) circuit to output a scan signal, to successively scan all the rows of sub pixels in the W rows of sub pixels.

Correspondingly, for the shift registers (E-RS1, E-RS2, . . . , and E-RS(N)) in the EOA(02) circuit, clock signal terminals (ECLK1 and ECLK2) are further disposed in the shift register G-RS, and clock signal lines (for example, ECKB1 and ECKB2) are further disposed in the peripheral area on the sidewall in the display panel 001. For example, one terminal of the clock signal line ECKB1 is connected to the clock signal terminal ECLK1, and the other terminal thereof is connected to the TCON. Correspondingly, one terminal of the clock signal line ECKB2 is connected to the clock signal terminal ECLK2, and the other terminal thereof is connected to the TCON. On the basis of this, clock signals input by the TCON through the clock signal line ECKB1 and the clock signal line ECKB2 control the output terminal Output of the shift register in the EOA(02) circuit to output a scan signal, to successively scan all the rows of sub pixels in the N rows of sub pixels.

It should be noted that in this application, the shift registers G-RSs in the GOA(01) circuit and the EOA(01) circuit may be referred to as a second group of shift registers, and the shift registers in the GOA(02) circuit and the EOA(02) circuit may be referred to as a first group of shift registers.

Figure 8:
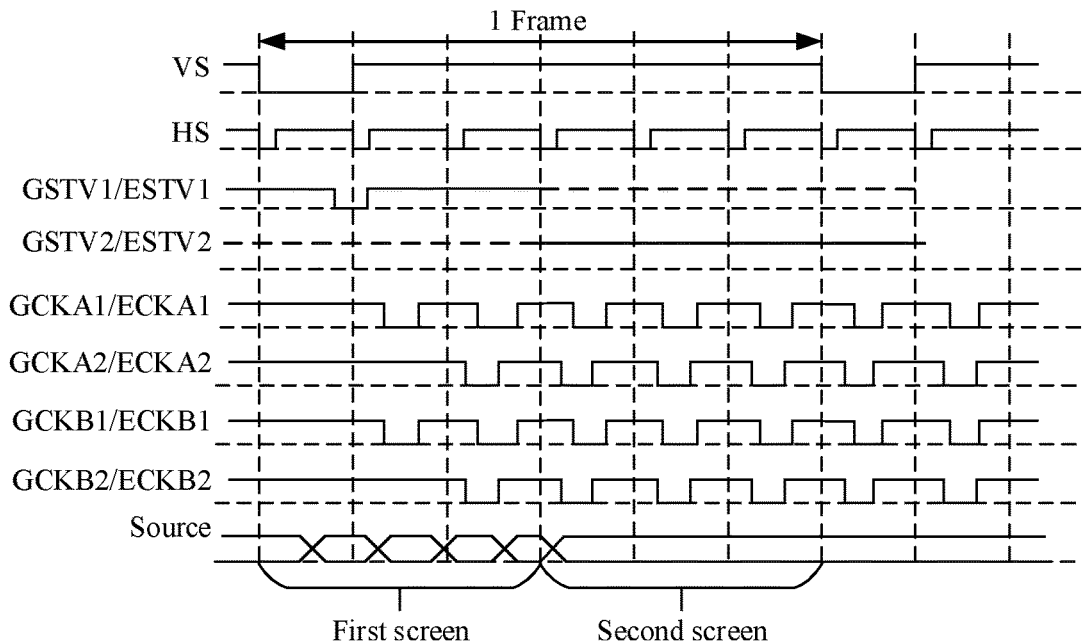
FIG. 8 is a timing diagram 2 of driving display of a foldable screen according to an embodiment of this application.

On the basis of the structures of the shift registers G-RSs in the GOA(01) circuit and the GOA(02) circuit and the structures of the shift registers E-RSs in the EOA(01) circuit and the EOA(02) circuit, referring to FIG. 8, FIG. 8 is a timing diagram of a shift register. For example, as shown in FIG. 8, when the foldable screen transitions from an unfolded state to the folded state, in an image display frame, a start signal received by the start signal terminal GSTV1 of the shift register G-RS is at a low level. In this case, clock signals received by the clock signal lines GCKA1 and GCKA2 are at a low level. Under the control of the clock signals, the output terminal Output of the shift register G-RS in the GOA(01) is controlled to output a scan signal, to scan each row of sub pixels in the W rows of sub pixels. During scanning of each row of sub pixels in the W rows of sub pixels, the data driver circuit writes a data voltage Vdata into the sub pixels under the control of a data signal Source. Correspondingly, in an image display frame, a start signal received by the start signal terminal ESTV1 of the shift register E-RS is at a low level. In this case, clock signals received by the clock signal lines ECKA1 and ECKA2 are at a low level. Under the control of the clock signals, the output terminal Output of the shift register E-RS in the EOA(01) is controlled to output a scan signal, to scan each row of sub pixels in the W rows of sub pixels. During scanning of each row of sub pixels in the W rows of sub pixels, the light emitting device L is controlled, based on a data voltage Vdata written into the sub pixels, to emit light, and a corresponding grayscale is displayed, to control the first screen to be turned on.

Further, still as shown in FIG. 8, in an image display frame, a start signal received by the start signal terminal GSTV2 of the shift register G-RS is at a high level. In this case, even if clock signals received by the clock signal lines GCKB1 and GCKB2 are at a low level, the output terminal Output of the shift register G-RS in the GOA(02) cannot output a scan signal, and therefore, none of the N rows of sub pixels can be scanned. When the data signal Source received by the data line DL is at a high level, the data driver circuit provides a blank data voltage for the sub pixels. Because the shift register in the GOA(02) can scan none of the N rows of sub pixels, the blank data voltage provided by the data driver circuit cannot be written into the sub pixels. Correspondingly, in an image display frame, a start signal received by the start signal terminal ESTV2 of the shift register E-RS is at a high level. In this case, even if clock signals received by the clock signal lines ECKB1 and ECKB2 are at a low level, the output terminal Output of the shift register E-RS in the EOA(02) cannot output a scan signal. Consequently, none of the N rows of sub pixels can be scanned. Therefore, the shift register E-RS in the EOA(02) cannot control the light emitting device L to emit light, to control the second screen to be blank.

It should be noted that for example descriptions of a vertical synchronization signal V_sync and a horizontal synchronization signal H_sync in FIG. 8, reference may be made to the foregoing embodiment, and details are not described herein again.

Based on the foregoing split-screen driving method, when no picture is displayed on the second screen, because the start signals received by the start signal terminal GSTV2 of the shift register G-RS and the start signal terminal ESTV2 of the shift register E-RS are at a high level, and pulling high the start signals of the start signal terminal GSTV2 and the start signal terminal ESTV2 of the shift register E-RS for a long time affects a characteristic of a transistor on the second screen, stress (stress) is generated on a channel of the transistor, resulting in a drift of a threshold voltage Vth of the transistor. In this way, when the foldable screen transitions from the folded state to the unfolded state, display brightness of sub pixels on a second display area (namely, the display area corresponding to the second screen) is non-uniform, and consequently, a split-screen problem that brightness of a first display area (namely, a display area corresponding to the first screen) and the second display area of the unfolded foldable screen is inconsistent.

On the basis of this, in some embodiments, in response to a transition of the foldable screen from the unfolded state to the folded state, the mobile phone outputs a first pulse signal to the first screen, and outputs a second pulse signal and a third pulse signal that periodically and alternately change to the second screen. The second pulse signal and the third pulse signal that periodically and alternately change are used to control the threshold voltage Vth of the transistor on the second screen to remain within a preset range. Further, the mobile phone successively scans all the rows of sub pixels in the W rows of sub pixels under the control of the first pulse signal, and writes a first data voltage into each row of sub pixels under the control of the first pulse signal during scanning of the sub pixels. The first data voltage is used to control the first screen to be turned on. The mobile phone successively scans the N rows of sub pixels under the control of the second pulse signal, and writes a second data voltage into each row of sub pixels under the control of the second pulse signal during scanning of the sub pixels. The second data voltage is used to control the second screen to be blank. The mobile phone does not scan the N rows of sub pixels under the control of the third pulse signal.

Figure 9:
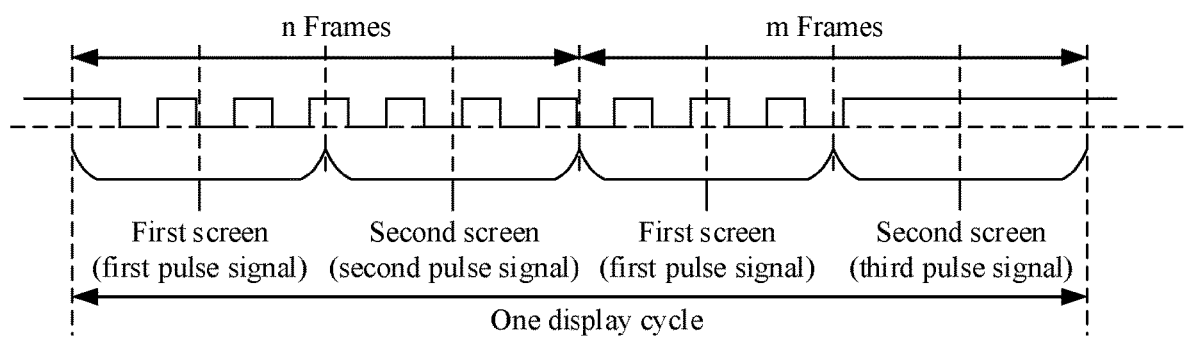
FIG. 9 is a timing diagram 3 of driving display of a foldable screen according to an embodiment of this application.

For example, as shown in FIG. 9, after the foldable screen transitions from the unfolded state to the folded state, in each of n image display frames, the mobile phone outputs the first pulse signal to the first screen, and outputs the second pulse signal to the second screen. After display of the n image display frames is completed, in each of m image display frames, the mobile phone outputs the first pulse signal to the first screen, and outputs the third pulse signal to the second screen. n and m are positive integers.

As shown in FIG. 9, the n image display frames and the m image display frames are one display cycle (for example, the first display cycle). Correspondingly, in the second display cycle, according to the foregoing display method, the mobile phone may output the first pulse signal to the first screen, and output the second pulse signal and the third pulse signal that alternately change to the second screen; and so on. In this way, when the foldable screen is in the folded state, the first pulse signal can be output to the first screen, and the second pulse signal and the third pulse signal that periodically and alternately change can be output to the second screen, until the foldable screen transitions from the folded state to the unfolded state.

In this application, values of n and m are related to a structure of the display panel 001 included in the foldable screen. For display panels of different structures, the threshold voltage Vth of the transistor on the second screen can remain within the preset range by setting different values of n and m. In other words, in this application, the values of n and m are not limited, and the values fall within the protection scope of this application provided that the threshold voltage Vth of the transistor on the second screen can remain within the preset range.

In addition, the preset range is not limited, and may be set based on a specific requirement. For example, the preset range may be that an absolute value of the threshold voltage Vth is within 0 V~1 V, that is, |Vth|=[0~1] V.

An example in which n=1 and m=3 is used. For example, assuming that the foldable screen displays Q image display frames in the unfolded state, after the foldable screen transitions from the unfolded state to the folded state, in a $(Q+1)^{th}$ image display frame, the mobile phone outputs the first pulse signal to the first screen, and outputs the second pulse signal to the second screen. In each of a $(Q+2)^{th}$ image display frame, a $(Q+3)^{th}$ image display frame, and a $(Q+4)^{th}$ image display frame, the mobile phone outputs the first pulse signal to the first screen, and outputs the third pulse signal to the second screen. Correspondingly, in a $(Q+5)^{th}$ image display frame, the mobile phone outputs the first pulse signal to the first screen, and outputs the second pulse signal to the second screen. In each of a $(Q+6)^{th}$ image display frame, a $(Q+7)^{th}$ image display frame, and a $(Q+8)^{th}$ image display frame, the mobile phone outputs the first pulse signal to the first screen, and outputs the third pulse signal to the second screen; and so on. In this way, when the foldable screen is in the folded state, the first pulse signal can be output to the first screen, and the second pulse signal and the third pulse signal that periodically and alternately change can be output to the second screen, until the foldable screen transitions from the folded state to the unfolded state. Q is a positive integer.

Figure 10:
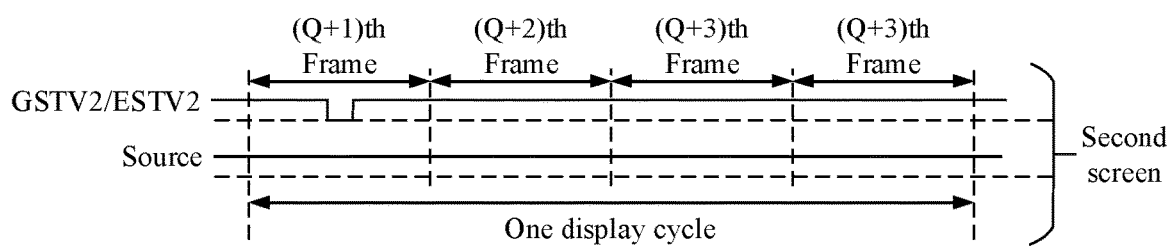
FIG. 10 is a timing diagram 1 of driving display of a second screen according to an embodiment of this application.

In some embodiments, the second pulse signal includes a first start signal, and the third pulse signal includes a second start signal. With reference to FIG. 7, as shown in FIG. 10, when the foldable screen is in the folded state, for the second screen, in a $(Q+1)^{th}$ image display frame image in a display cycle, a start signal (namely, a first start signal) received by the start signal terminal GSTV2 of the shift register G-RS is at a low level, and each row of sub pixels in the N rows of sub pixels is scanned under the control of the first start signal. During scanning of each row of sub pixels in the N rows of sub pixels, a data signal Source (namely, a first data signal) received by the data line DL is at a high level, and the data driver circuit writes a blank data voltage (namely, a second data voltage) into the sub pixels under the control of the first data signal. Correspondingly, in the $(Q+1)^{th}$ image display frame, a start signal (namely, a first start signal) received by the start signal terminal ESTV2 of the shift register E-RS is at a low level, and each row of sub pixels in the N rows of sub pixels is scanned under the control of the first start signal. During scanning of each row of sub pixels in the N rows of sub pixels, the light emitting device L is controlled, based on the second data voltage written into the sub pixels, to emit light. Because the second data voltage is a blank data voltage, a grayscale displayed on the light emitting device L is L0, so that the second screen is controlled to be blank.

In a $(Q+2)^{th}$ image display frame in a display cycle, a start signal (namely, a second start signal) received by the start signal terminal GSTV2 of the shift register G-RS is at a high level, and the shift register G-RS in the GOA(02) can scan none of the N rows of sub pixels under the control of the second start signal. Therefore, the data line DL cannot write a second data voltage into the sub pixels under the control of a high-level first data signal. Correspondingly, in the (Q30 2)$^{th}$ image display frame, a start signal (namely, a second start signal) received by the start signal terminal ESTV2 of the shift register E-RS is at a high level. The shift register E-RS in the EOA(02) can scan none of the N rows of sub pixels under the control of the second start signal, so that the light emitting device L cannot be controlled to emit light, thereby controlling the second screen to be blank.

It should be noted that for a method for displaying the foregoing $(Q+3)^{th}$ image display frame and $(Q+4)^{th}$ image display frame, reference may be made to the method for displaying the $(Q+2)^{th}$ image display frame in the foregoing embodiment, and details are not described herein again.

In conclusion, in a display cycle, in n image display frames, first start signals received by the start signal terminal GSTV2 of the shift register G-RS and the start signal terminal ESTV2 of the shift register E-RS are pulled low, and a blank data voltage is written into the sub pixels on the second screen, to control the second screen to be blank. In m image display frames, second start signals received by the start signal terminal GSTV2 of the shift register G-RS and the start signal terminal ESTV2 of the shift register E-RS are pulled high, so that the shift register G-RS and the shift register E-RS can scan none of the N rows of sub pixels on the second screen, thereby controlling the second screen to be blank. In this way, the start signals received by the start signal terminal GSTV2 and the start signal terminal ESTV2 periodically alternately change between a high level and a low level, to avoid a problem of a drift of the threshold voltage Vth of the transistor on the second screen caused by pulling high the start signals received by the start signal terminal GSTV2 and the start signal terminal ESTV2 for a long time. In this way, when the foldable screen transitions from the folded state to the unfolded state, the following split-screen problem can be resolved: Brightness of the foldable screen is inconsistent because display brightness of pixels in the second display area is non-uniform.

Figure 11:
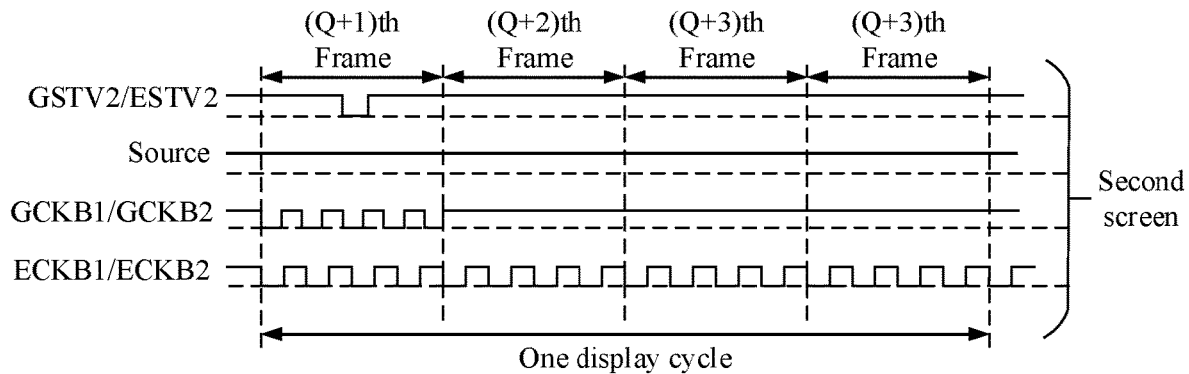
FIG. 11 is a timing diagram 2 of driving display of a second screen according to an embodiment of this application.

In some embodiments, the second pulse signal further includes a first clock signal, and the third pulse signal further includes a second clock signal. As shown in FIG. 11, when the foldable screen is in the folded state, for the second screen, in a $(Q+1)^{th}$ image display frame in a display cycle, a start signal (namely, a first start signal) received by the start signal terminal GSTV2 of the shift register G-RS is at a low level. In this case, clock signals (namely, first clock signals) received by the clock signal lines GCKB1 and GCKB2 are at a low level. Under the control of the first clock signals, the output terminal Output of the shift register G-RS in the GOA(02) is controlled to output a scan signal, to scan each row of sub pixels in the N rows of sub pixels. During scanning of each row of sub pixels in the N rows of sub pixels, a data signal Source (namely, a first data signal) received by the data line DL is at a high level, and the data driver circuit writes a blank data voltage (namely, a second data voltage) into the sub pixels under the control of the first data signal. Correspondingly, in the $(Q+1)^{th}$ image display frame, a start signal (namely, a first start signal) received by the start signal terminal ESTV2 of the shift register E-RS is at a low level. In this case, clock signals (namely, first clock signals) received by the clock signal lines ECKB1 and ECKB2 are at a low level. Under the control of the first clock signals, the output terminal Output of the shift register E-RS in the EOA(02) is controlled to output a scan signal, to scan each row of sub pixels in the N rows of sub pixels. During scanning of each row of sub pixels in the N rows of sub pixels, the light emitting device L is controlled, based on the second data voltage written into the sub pixels, to emit light. Because the second data voltage is a blank data voltage, a grayscale displayed on the sub pixels is L0, so that the second screen is controlled to be blank.

In a $(Q+2)^{th}$ image display frame in a display cycle, a start signal (namely, a second start signal) received by the start signal terminal GSTV2 of the shift register G-RS is at a high level. In this case, clock signals (namely, second clock signals) received by the clock signal lines GCKB1 and GCKB2 are at a high level. Therefore, the shift register G-RS in the GOA(02) can scan none of the N rows of sub pixels. Consequently, the data line DL cannot write a second data voltage into the sub pixels under the control of a high-level first data signal. Correspondingly, in the $(Q+2)^{th}$ image display frame, a start signal (namely, a second start signal) received by the start signal terminal ESTV2 of the shift register E-RS is at a high level, and clock signals (namely, second clock signals) received by the clock signal lines ECKB1 and ECKB2 are at a low level. The shift register E-RS scans each row of sub pixels in the N rows of sub pixels under the control of the second clock signals. Because the second data voltage is not written into the sub pixels, the light emitting device L cannot emit light, so that the second screen can be controlled to be blank.

It should be noted that for a method for displaying the foregoing $(Q+3)^{th}$ image display frame and $(Q+4)^{th}$ image display frame, reference may be made to the method for displaying the $(Q+2)^{th}$ image display frame in the foregoing embodiment, and details are not described herein again.

In conclusion, in a display cycle, clock signals received by the clock signal lines GCKB1 and GCKB2 are pulled low in n image display frames, and clock signals received by the clock signal lines GCKB1 and GCKB2 are pulled high in m image display frames. In this way, the clock signals received by the clock signal lines GCKB1 and GCKB2 periodically alternately change between a high level and a low level, to further reduce power consumption while resolving the split-screen problem that brightness of the foldable screen is inconsistent because display brightness of the pixels in the second display area is non-uniform.

It should be noted that after the clock signals received by the clock signal lines GCKB1 and GCKB2 are pulled high, a transistor included in the shift register G-RS in the GOA(02) may be in a cut-off state, in other words, the transistor does not work, so that power consumption can be reduced.

In addition, to not affect a light emitting time of the light emitting device L, in this embodiment of this application, in each image display frame in a display cycle, second clock signals received by the clock signal lines ECKB1 and ECKB2 are at a low level.

Figure 12:
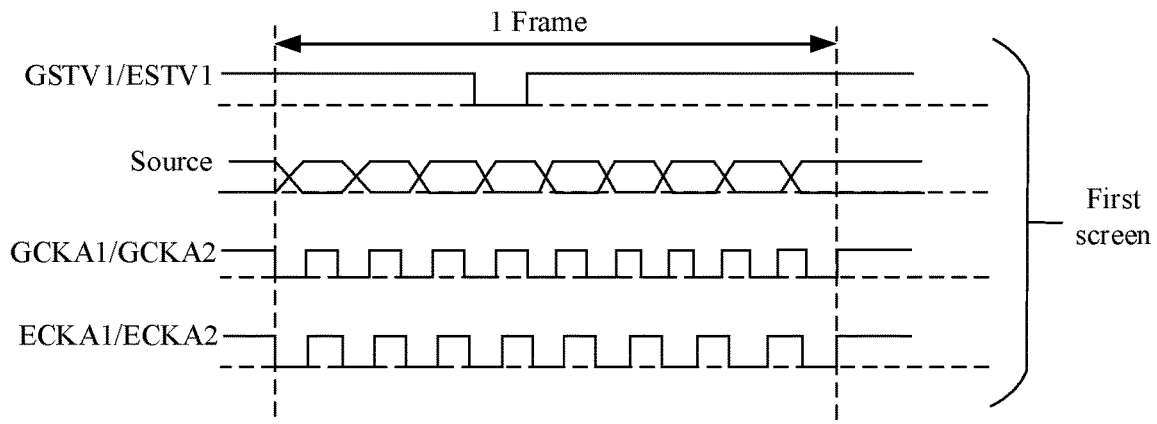
FIG. 12 is a timing diagram of driving display of a first screen according to an embodiment of this application.

In some embodiments, as shown in FIG. 12, when the foldable screen is in the folded state, for the first screen for display, in each image display frame, a start signal (namely, a third start signal) received by the start signal terminal GSTV1 of the shift register G-RS is at a low level. In this case, clock signals received by the clock signal lines GCKA1 and GCKA2 are at a low level. Under the control of the clock signals, the output terminal Output of the shift register G-RS in the GOA(01) is controlled to output a scan signal, to scan each row of sub pixels in the N rows of sub pixels. During scanning of each row of sub pixels in the N rows of sub pixels, the data driver circuit writes a data voltage Vdata into the sub pixels under the control of a data signal Source. Correspondingly, in each image display frame, a start signal (namely, a third start signal) received by the start signal terminal ESTV1 of the shift register E-RS is at a low level. In this case, clock signals received by the clock signal lines ECKA1 and ECKA2 are at a low level. Under the control of the clock signals, the output terminal Output of the shift register E-RS in the EOA(01) is controlled to output a scan signal, to scan each row of sub pixels in the N rows of sub pixels. During scanning of each row of sub pixels in the N rows of sub pixels, the light emitting device L is controlled, based on the data voltage Vdata written into the sub pixels, to emit light, so that a corresponding grayscale is displayed on the light emitting device L, thereby controlling the first screen to be turned on.

In some embodiments, as shown in FIG. 1, the mobile phone includes a display driver device 120, and the display driver device 120 may be a display driver integrated circuit DDIC. The DDIC is configured to provide information about various displayed pictures to the foldable screen after being powered on. For example, the DDIC may be configured to output the first pulse signal to the first screen, and output the second pulse signal and the third pulse signal that periodically and alternately change to the second screen.

For example, the DDIC may include the foregoing timing controller (TCON), and the TCON may input clock signals to the GOA circuit through the clock signal lines GCKB1 and GCKB2, and input clock signal to the EOA circuit through the clock signal lines ECKB1 and ECKB2. Correspondingly, the TCON may further input a data signal Source to the data driver circuit through the data line DL.

Further, in this application, the DDIC may provide a data voltage (for example, a first data voltage and the second data voltage) to the data driver circuit, to control the data driver circuit to write the data voltage into sub pixels under the control of the data signal Source.

To improve picture quality dynamics, in some embodiments, the display panel has a porch area (porch area), which may also be referred to as a blanking area (blanking area), between two adjacent frames. For example, before an image display frame is displayed or after display of an image frame ends, the GOA circuit performs a dummy scan for a period of time, and then displays a next image display frame. In other words, each image display frame includes a display phase and a non-display phase. The display phase is an active display area (namely, an active area), and the non-display phase is a porch area.

In some embodiments, to not affect a picture display effect, in each display cycle, a management device (for example, the foregoing processor such as an AP) in the mobile phone delivers a first control command to the DDIC in the non-display phase in the first image display frame in n image display frames, to control the DDIC to output the first pulse signal to the first screen and output the second pulse signal to the second screen. Correspondingly, after display of the n image display frames is completed, the mobile phone delivers a second control command to the DDIC in the non-display phase in the first image display frame in m image display frames, to control the DDIC to output the first pulse signal to the first screen and output the third pulse signal to the second screen.

In this way, the mobile phone can control, by periodically delivering the first control command and the second control command to the DDIC, the DDIC to output the first pulse signal to the first screen and output the second pulse signal and the third pulse signal that alternately change to the second screen, until the electronic device transitions from the folded state to the unfolded state.

Figure 13:
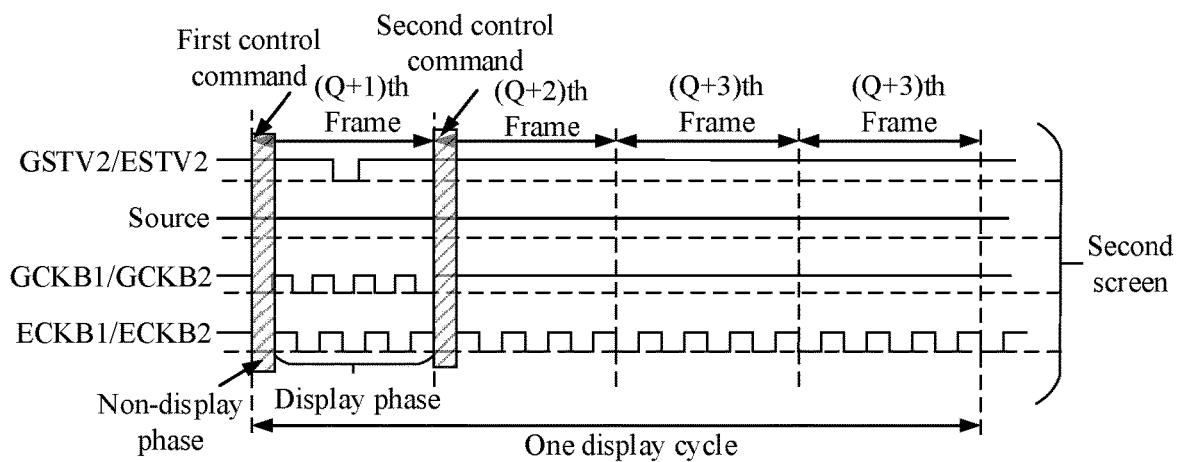
FIG. 13 is a timing diagram 3 of driving display of a second screen according to an embodiment of this application.

An example in which n=1 and m=3 is still used. As shown in FIG. 13, assuming that the foldable screen can display Q image display frames in the unfolded state, when the foldable screen transitions from the unfolded state to the folded state, in a $(Q+1)^{th}$ image display frame in a display cycle, the AP delivers the first control command to the DDIC in the non-display phase in the $(Q+1)^{th}$ image display frame, to control the DDIC to output the first pulse signal to the first screen and output the second pulse signal to the second screen. In a $(Q+2)^{th}$ image display frame, a $(Q+3)^{th}$ image display frame, and a $(Q+4)^{th}$ image display frame in a display cycle, the AP delivers the second control command to the DDIC in the non-display phase in the $(Q+2)^{th}$ image display frame, to control the first pulse signal to be output to the first screen and the third pulse signal to be output to the second screen.

For example, the first control command and the second control command each may be a command (command) prompt, namely, a CMD command, or may be another feasible control command. This is not limited in this application.

It should be noted that for a specific implementation in which the DDIC outputs the first pulse signal to the first screen and outputs the second pulse signal and the third pulse signal to the second screen, reference may be made to the foregoing embodiment, and details are not described herein again.

In addition, in this embodiment of this application, the AP may alternatively deliver the second control command to the DDIC in the non-display phase in the $(Q+1)^{th}$ image display frame; or deliver the first control command to the DDIC in the non-display phase in the $(Q+2)^{th}$ image display frame. Alternatively, a control command may be delivered to the DDIC in the non-display phase in the $(Q+3)^{th}$ (or $(Q+4)^{th}$) image display frame. This is not specifically limited in this application.

In some other embodiments, the number of sub pixel lines (also referred to as NL setting) is preset in the DDIC, and the DDIC outputs different pulse signals to the foldable screen based on the number of sub pixel lines (NL setting) and a folding status of the foldable screen. The number of sub pixel lines (NL setting) changes with the folding status of the foldable screen. For example, when the foldable screen is in the folded state, the number of sub pixel lines (NL setting) is equal to the number of sub pixel lines of the first screen. When the foldable screen is in the unfolded state, the number of sub pixel lines (NL setting) is equal to the number of full-screen sub pixel lines of the foldable screen.

For example, when the foldable screen is in the folded state, in the $(Q+1)^{th}$ image display frame, the DDIC outputs the first pulse signal based on the preset number of sub pixel lines (NL setting), and after scanning of sub pixels corresponding to the number of sub pixel lines (NL setting) is completed, the DDIC outputs the second pulse signal to complete displaying the $(Q+1)^{th}$ image display frame. Correspondingly, in the $(Q+2)^{th}$ image display frame, the DDIC outputs the first pulse signal to the preset number of sub pixel lines (NL setting) based on the number of sub pixel lines (NL setting), and after scanning of sub pixels corresponding to the number of sub pixel lines (NL setting) is completed, the DDIC outputs the third pulse signal to complete displaying the $(Q+1)^{th}$ image display frame. This process is repeated until the foldable screen transitions from the folded state to the unfolded state.

In some embodiments, the mobile phone outputs a fourth pulse signal to the foldable screen in response to a transition of the foldable screen from the folded state to the unfolded state. The mobile phone successively scans all the rows of sub pixels in the M rows of sub pixels under the control of the fourth pulse signal, and writes a third data voltage into each row of sub pixels under the control of the fourth pulse signal during scanning of the sub pixels. The third data voltage is used to control the foldable screen to be turned on.

For example, the fourth pulse signal may include start signals received by the start signal terminal GSTV1, the start signal terminal GSTV2, the start signal terminal ESTV1, and the start signal terminal ESTV2. Certainly, the fourth pulse signal may alternatively include clock signals received by the clock signal lines GCKA1 and GCKA2, the clock signal lines ECKA1 and ECKA2, the clock signal lines GCKB1 and GCKB2, and the clock signal lines ECKB1 and ECKB2.

Figure 14:
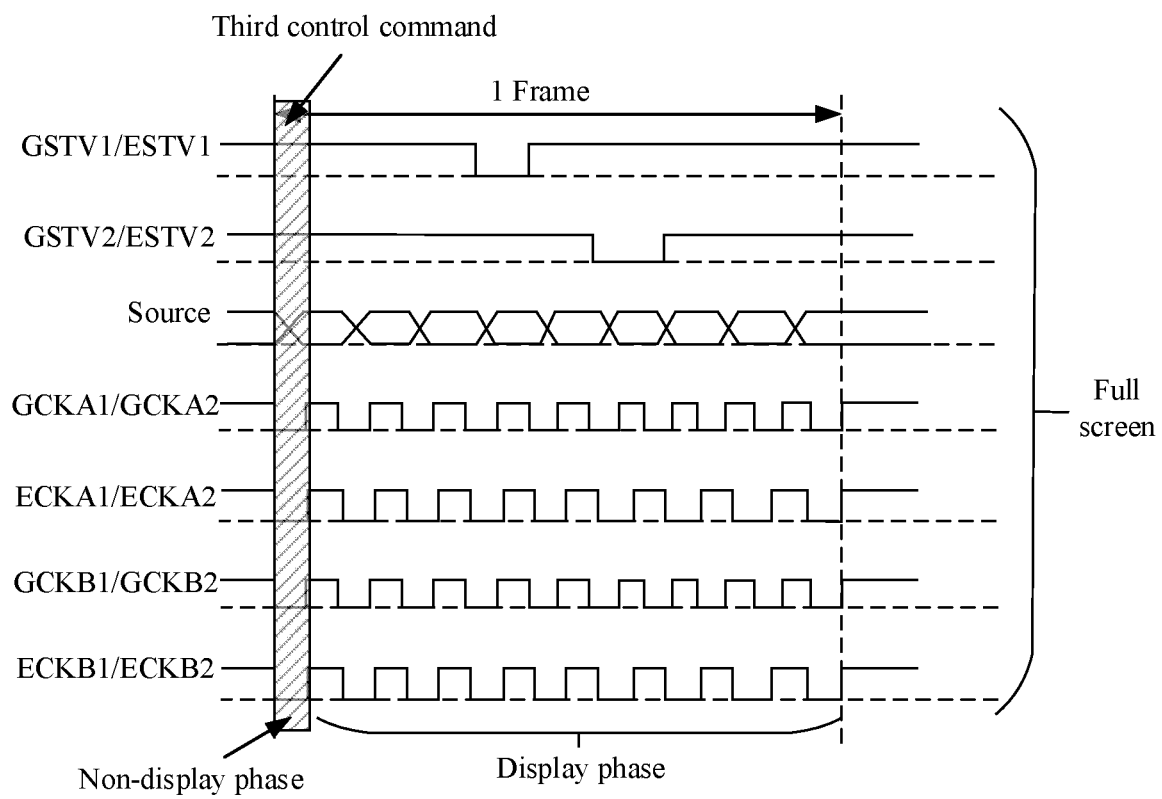
FIG. 14 is a timing diagram 4 of driving display of a foldable screen according to an embodiment of this application.

For example, as shown in FIG. 14, when the foldable screen transitions from the folded state to the unfolded state, for the first display area, in each image display frame, a start signal received by the start signal terminal GSTV1 of the shift register G-RS is at a low level. In this case, clock signals received by the clock signal lines GCKA1 and GCKA2 are at a low level. Under the control of the clock signals, the output terminal Output of the shift register G-RS in the GOA(01) is controlled to output a scan signal, to scan each row of sub pixels in the W rows of sub pixels. During scanning of each row of sub pixels in the W rows of sub pixels, the data driver circuit writes a data voltage Vdata into the sub pixels under the control of a data signal Source. Correspondingly, in each image display frame, a start signal received by the start signal terminal ESTV1 of the shift register E-RS is at a low level. In this case, clock signals received by the clock signal lines ECKA1 and ECKA2 are at a low level. Under the control of the clock signals, the output terminal Output of the shift register E-RS in the EOA(01) is controlled to output a scan signal, to scan each row of sub pixels in the W rows of sub pixels. During scanning of each row of sub pixels in the W rows of sub pixels, the light emitting device L is controlled, based on the data voltage Vdata written into the sub pixels, to emit light, so that a corresponding grayscale is displayed on the sub pixels, thereby controlling the first display area to be turned on.

For the second display area, in each image display frame, a start signal received by the start signal terminal GSTV2 of the shift register G-RS is at a low level. In this case, clock signals received by the clock signal lines GCKB1 and GCKB2 are at a low level. Under the control of the clock signals, the output terminal Output of the shift register G-RS in the GOA(02) is controlled to output a scan signal, to scan each row of sub pixels in the W rows of sub pixels. During scanning of each row of sub pixels in the W rows of sub pixels, the data driver circuit writes a data voltage Vdata into the sub pixels under the control of a data signal Source. Correspondingly, in each image display frame, a start signal received by the start signal terminal ESTV2 of the shift register E-RS is at a low level. In this case, clock signals received by the clock signal lines ECKB1 and ECKB2 are at a low level. Under the control of the clock signals, the output terminal Output of the shift register E-RS in the EOA(02) is controlled to output a scan signal, to scan each row of sub pixels in the W rows of sub pixels. During scanning of each row of sub pixels in the W rows of sub pixels, the light emitting device L is controlled, based on the data voltage Vdata written into the sub pixels, to emit light, so that a corresponding grayscale is displayed on the sub pixels, thereby controlling the second display area to be turned on.

It may be understood that the first display area corresponds to the first screen, and the second display area corresponds to the second screen.

In some embodiments, after the foldable screen transitions from the folded state to the unfolded state, the electronic device may deliver a third control command to the DDIC in the non-display phase in the first image display frame, to control the DDIC to output the fourth pulse signal to the foldable screen in the display phase in each image display frame. Certainly, the electronic device may further deliver the third control command to the DDIC in the non-display phase in each image display frame. This is not limited in this application.

For example descriptions of the third control command, refer to the foregoing embodiment. Details are not described herein again.

It should be noted that the content described in the embodiments of this application can explain the technical solutions in other embodiments of this application, and the technical features described in the embodiments may also be applied to other embodiments and combined with technical features in the other embodiments to form a new solution. This application describes only several embodiments as examples, and it does not represent that this application is limited thereto.

An embodiment of this application provides an electronic device, including a foldable screen, a memory, and one or more processors. The foldable screen is foldable to form at least two screens, the at least two screens include a first screen and a second screen, and when the foldable screen is in a folded state, the first screen and the second screen face away from each other. The foldable screen, the memory, and the processor are coupled to each other. The memory is configured to store computer program code, the computer program code includes computer instructions, and when the processor executes the computer instructions, the electronic device is enabled to perform the functions or steps performed by the foregoing mobile phone. For example, for a structure of the electronic device, reference may be made to the structure of the mobile phone 100 shown in FIG. 1.

Figure 15:
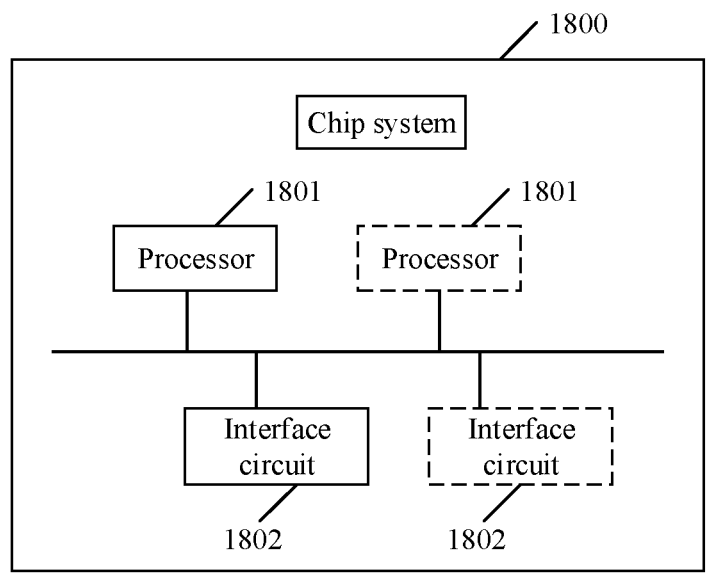
FIG. 15 is a schematic diagram of a structure of a chip system according to an embodiment of this application.

An embodiment of this application further provides a chip system. As shown in FIG. 15, the chip system 1800 includes at least one processor 1801 and at least one interface circuit 1802. The processor 1801 may be the processor shown in FIG. 1 in the foregoing embodiments. The interface circuit 1802 may be, for example, an interface circuit between the processor and an external memory or an interface circuit between the processor and an internal memory 140.

The processor 1801 and the interface circuit 1802 may be interconnected by using a line. For example, the interface circuit 1802 may be configured to receive a signal from another apparatus (for example, a memory of an electronic device). For another example, the interface circuit 1802 may be configured to send a signal to another apparatus (for example, the processor 1801). For example, the interface circuit 1802 may read instructions stored in the memory, and send the instructions to the processor 1801. When the instructions are executed by the processor 1801, the electronic device may be enabled to perform the steps performed by the mobile phone in the foregoing embodiments. Certainly, the chip system may further include another discrete device. This is not specifically limited in this embodiment of this application.

It can be clearly learned by a person skilled in the art from the foregoing descriptions of the implementations that for convenience and brevity of description, only division into the foregoing functional modules is used as an example for description. In actual application, the foregoing functions may be allocated to different functional modules for implementation based on a requirement, in other words, an internal structure of an apparatus is divided into different functional modules, to complete all or some of the functions described above.

In the several embodiments provided in this application, it should be understood that the disclosed apparatus and method may be implemented in another manner. For example, the apparatus embodiments described above are merely examples. For example, division into modules or units is merely logical function division. In actual implementation, there may be another division manner. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may be one or more physical units, in other words, may be located in one place, or may be distributed in a plurality of different places. Some or all of the units may be selected based on actual requirements to achieve the objectives of the solutions in the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in the embodiments of this application. The storage medium includes various media that can store program code, for example, a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

The invention claimed is:

1. A method, comprising:
   outputting, in response to a transition of a foldable screen from an unfolded state to a folded state, a first pulse signal to a first screen of the foldable screen, and outputting a second pulse signal and a third pulse signal that periodically and alternately change to a second screen of the foldable screen, wherein the second pulse signal and the third pulse signal that periodically and alternately change are configured to control a threshold voltage of a transistor on the second screen to remain within a preset range, wherein when the foldable screen is in a folded state, the first screen and the second screen face away from each other, and wherein the first screen comprises W rows of sub pixels, the second screen comprises N rows of sub pixels, and W and N are positive integers;
   successively scanning all rows of sub pixels in the W rows of sub pixels under control of the first pulse signal, and writing a first data voltage into each row of sub pixels under the control of the first pulse signal during scanning of the sub pixels, wherein the first data voltage is configured to control the first screen to be turned on;
   successively scanning the N rows of sub pixels under control of the second pulse signal, and writing a second data voltage into each row of sub pixels under the control of the second pulse signal during scanning of the sub pixels, wherein the second data voltage is configured to control the second screen to be blank; and
   not scanning the N rows of sub pixels under control of the third pulse signal.

2. The method of claim 1, wherein a display driver integrated circuit (DDIC) outputs the first pulse signal to the first screen, and outputs the second pulse signal and the third pulse signal that periodically and alternately change to the second screen.

3. The method of claim 2, wherein there is a display phase and a non-display phase in each image display frame, and wherein the DDIC outputting the first pulse signal to the first screen and outputting the second pulse signal and the third pulse signal that periodically and alternately change to the second screen comprises:
   delivering, in a first image display frame in n image display frames, a first control command to the DDIC in the non-display phase, wherein the first control command is to control the DDIC to output the first pulse signal to the first screen and output the second pulse signal to the second screen in the display phase in the n image display frames;
   delivering, after display of the n image display frames is completed, in the first image display frame in m image display frames, a second control command to the DDIC in the non-display phase, wherein the second control command is to control the DDIC to output the first pulse signal to the first screen and output the third pulse signal to the second screen in the display phase in the m image display frames, and n and m are positive integers; and
   periodically delivering the first control command and the second control command to the DDIC, to control the DDIC to output the first pulse signal to the first screen and output the second pulse signal and the third pulse signal that alternately change to the second screen.

4. The method of claim 2, wherein the foldable screen comprises a display panel, the display panel has a display area and a peripheral area around the display area, the peripheral area is provided with a first group of shift registers and a data driver that are connected to the DDIC, and the first group of shift registers is connected to each row of sub pixels in the N rows of sub pixels and is configured to scan each row of sub pixels, wherein N is a positive integer, wherein the data driver is configured to provide a data voltage for each row of sub pixels during scanning of the sub pixels, wherein the second pulse signal comprises a first start signal, and the third pulse signal comprises a second start signal, and wherein successively scanning the N rows of sub pixels under the control of the second pulse signal, and writing a second data voltage into each row of sub pixels under the control of the second pulse signal during scanning of the sub pixels comprises:

controlling, in each of n image display frames the DDIC to output the first start signal to the first group of shift registers, and scanning, by the first group of shift registers, each row of sub pixels in the N rows of sub pixels under the control of the first start signal; and controlling, during scanning of each row of sub pixels, the DDIC to output a first data signal to the data driver, and writing, by the data driver, the second data voltage into the sub pixels under the control of the first data signal, wherein not scanning the N rows of sub pixels under the control of the third pulse signal comprises controlling, after display of the n image display frames is completed, in each of m image display frames, the DDIC to output the second start signal to the first group of shift registers, and scanning, by the first group of shift registers, none of the N rows of sub pixels under the control of the second start signal.

5. The method of claim 4, wherein the peripheral area is further provided with a second group of shift registers connected to the DDIC, and the second group of shift registers is connected to each row of sub pixels in the W rows of sub pixels and is configured to scan each row of sub pixels, wherein W is a positive integer, and wherein the first pulse signal comprises a third start signal, and successively scanning all rows of sub pixels in the W rows of sub pixels under the control of the first pulse signal, and writing a first data voltage into each row of sub pixels under the control of the first pulse signal during scanning of the sub pixels comprises:

controlling, in each image display frame, the DDIC to output the third start signal to the second group of shift registers, and scanning, by the second group of shift registers, wherein each row of sub pixels in the W rows of sub pixels is under the control of the third start signal; and controlling, during scanning of each row of sub pixels the DDIC to output the second data signal to the data driver, and writing, by the data driver, the first data voltage into the sub pixels under the control of the second data signal.

6. The method according to claim 1, wherein the second pulse signal further comprises a first clock signal, and the third pulse signal further comprises a second clock signal, and wherein the first clock signal and the second clock signal are configured to control at least some of transistors on the second screen to be in a cut-off state.

7. The method according to claim 1, further comprising:

outputting a fourth pulse signal to the foldable screen in response to a transition of the foldable screen from the folded state to the unfolded state, wherein the foldable screen comprises M rows of sub pixels, M is a positive integer, and M=W+N; and successively scanning all rows of sub pixels in the M rows of sub pixels under the control of the fourth pulse signal, and writing a third data voltage into each row of sub pixels under the control of the fourth pulse signal during scanning of the sub pixels, wherein the third data voltage is configured to control the foldable screen to be turned on.

8. The method of claim 7, wherein there is a display phase and a non-display phase in each image display frame, and outputting the fourth pulse signal to the foldable screen comprises delivering, after the foldable screen transitions from the folded state to the unfolded state, a third control command to a display driver integrated circuit (DDIC) in the non-display phase in a first image display frame, wherein the third control command is to control the DDIC to output the fourth pulse signal to the foldable screen in the display phase in each image display frame.

9. An electronic device, comprising:

a foldable screen that is foldable to form at least two screens, wherein the at least two screens comprise a first screen and a second screen, and when the foldable screen is in a folded state, the first screen and the second screen face away from each other, and wherein the first screen comprises W rows of sub pixels, the second screen comprises N rows of sub pixels, and W and N are positive integers;

one or more processors coupled to the foldable screen; and a memory coupled to the one or more processors and configured to store instructions that, when executed by the one or more processors, cause the electronic device to be configured to:

output, in response to a transition of the foldable screen from an unfolded state to the folded state, a first pulse signal to the first screen, and output a second pulse signal and a third pulse signal that periodically and alternately change to the second screen, wherein the second pulse signal and the third pulse signal that periodically and alternately change are configured to control a threshold voltage of a transistor on the second screen to remain within a preset range;

successively scan all rows of sub pixels in the W rows of sub pixels under control of the first pulse signal, and write a first data voltage into each row of sub pixels under the control of the first pulse signal during scanning of the sub pixels, wherein the first data voltage is configured to control the first screen to be turned on;

successively scan the N rows of sub pixels under control of the second pulse signal, and write a second data voltage into each row of sub pixels under the control of the second pulse signal during scanning of the sub pixels, wherein the second data voltage is configured to control the second screen to be blank; and not scan the N rows of sub pixels under control of the third pulse signal.

10. The electronic device of claim 9, further comprising a display driver integrated circuit (DDIC) configured to output the first pulse signal to the first screen, and to output the second pulse signal and the third pulse signal that periodically and alternately change to the second screen.

11. The electronic device of claim 10, wherein there is a display phase and a non-display phase in each image display frame, and wherein the electronic device is further configured to:
  deliver, in a first image display frame in n image display frames, a first control command to the DDIC in the non-display phase, wherein the first control command is to control the DDIC to output the first pulse signal to the first screen and output the second pulse signal to the second screen in the display phase in the n image display frames;
  deliver, after display of the n image display frames is completed, in the first image display frame in m image display frames, a second control command to the DDIC in the non-display phase, wherein the second control command is to control the DDIC to output the first pulse signal to the first screen and output the third pulse signal to the second screen in the display phase in the m image display frames, and n and m are positive integers; and
  periodically deliver the first control command and the second control command to the DDIC, to control the DDIC to output the first pulse signal to the first screen and output the second pulse signal and the third pulse signal that alternately change to the second screen.

12. The electronic device of claim 10, wherein the foldable screen comprises a display panel, the display panel has a display area and a peripheral area around the display area, the peripheral area is provided with a first group of shift registers and a data driver that are connected to the DDIC, and the first group of shift registers is connected to each row of sub pixels in the N rows of sub pixels and is configured to scan each row of sub pixels, wherein N is a positive integer, wherein the data driver is configured to provide a data voltage for each row of sub pixels during scanning of the sub pixels, wherein the second pulse signal comprises a first start signal, and the third pulse signal comprises a second start signal, and wherein successively scanning the N rows of sub pixels under the control of the second pulse signal, and writing a second data voltage into each row of sub pixels under the control of the second pulse signal during scanning of the sub pixels comprises:
  controlling, in each of n image display frames the DDIC to output the first start signal to the first group of shift registers, and scanning, by the first group of shift registers, each row of sub pixels in the N rows of sub pixels under the control of the first start signal; and
  controlling, during scanning of each row of sub pixels, the DDIC to output a first data signal to the data driver, and writing, by the data driver, the second data voltage into the sub pixels under the control of the first data signal, wherein not scanning the N rows of sub pixels under the control of the third pulse signal comprises controlling, after display of the n image display frames is completed, in each of m image display frames, the DDIC to output the second start signal to the first group of shift registers, and scanning, by the first group of shift registers, none of the N rows of sub pixels under the control of the second start signal.

13. The electronic device of claim 12, wherein the peripheral area is further provided with a second group of shift registers connected to the DDIC, and the second group of shift registers is connected to each row of sub pixels in the W rows of sub pixels and is configured to scan each row of sub pixels, wherein W is a positive integer, and wherein the first pulse signal comprises a third start signal, and successively scanning all rows of sub pixels in the W rows of sub pixels under the control of the first pulse signal, and writing a first data voltage into each row of sub pixels under the control of the first pulse signal during scanning of the sub pixels comprises:
  controlling, in each image display frame, the DDIC to output the third start signal to the second group of shift registers, and scanning, by the second group of shift registers, wherein each row of sub pixels in the W rows of sub pixels is under the control of the third start signal; and
  controlling, during scanning of each row of sub pixels the DDIC to output the second data signal to the data driver, and writing, by the data driver, the first data voltage into the sub pixels under the control of the second data signal.

14. The electronic device of claim 9, wherein the second pulse signal further comprises a first clock signal, and the third pulse signal further comprises a second clock signal, and wherein the first clock signal and the second clock signal are configured to control at least some of transistors on the second screen to be in a cut-off state.

15. The electronic device of claim 9, wherein the instructions, when executed by the one or more processors, cause the electronic device to be further configured to:
  output a fourth pulse signal to the foldable screen in response to a transition of the foldable screen from the folded state to the unfolded state, wherein the foldable screen comprises M rows of sub pixels, M is a positive integer, and M=W+N; and
  successively scan all rows of sub pixels in the M rows of sub pixels under the control of the fourth pulse signal, and write a third data voltage into each row of sub pixels under the control of the fourth pulse signal during scanning of the sub pixels, wherein the third data voltage is configured to control the foldable screen to be turned on.

16. The electronic device of claim 15, further comprising a display driver integrated circuit (DDIC), wherein there is a display phase and a non-display phase in each image display frame, and outputting the fourth pulse signal to the foldable screen comprises delivering, after the foldable screen transitions from the folded state to the unfolded state, a third control command to the DDIC in the non-display phase in a first image display frame, wherein the third control command is to control the DDIC to output the fourth pulse signal to the foldable screen in the display phase in each image display frame.

17. A non-transitory computer-readable storage medium storing instructions that, when executed by one or more processors of an electronic device, cause the electronic device to be configured to:
  output, in response to a transition of a foldable screen from an unfolded state to a folded state, a first pulse signal to a first screen of the foldable screen, and output a second pulse signal and a third pulse signal that periodically and alternately change to a second screen of the foldable screen, wherein the second pulse signal and the third pulse signal that periodically and alternately change are configured to control a threshold voltage of a transistor on the second screen to remain within a preset range, wherein when the foldable screen is in a folded state, the first screen and the second screen face away from each other, and wherein the first screen comprises W rows of sub pixels, the second screen comprises N rows of sub pixels, and W and N are positive integers;

successively scan all rows of sub pixels in the W rows of sub pixels under control of the first pulse signal, and write a first data voltage into each row of sub pixels under the control of the first pulse signal during scanning of the sub pixels, wherein the first data voltage is configured to control the first screen to be turned on;

successively scan the N rows of sub pixels under control of the second pulse signal, and write a second data voltage into each row of sub pixels under the control of the second pulse signal during scanning of the sub pixels, wherein the second data voltage is configured to control the second screen to be blank; and not scan the N rows of sub pixels under control of the third pulse signal.

18. The non-transitory computer-readable storage medium of claim 17, wherein a display driver integrated circuit (DDIC) is configured to output the first pulse signal to the first screen, and to output the second pulse signal and the third pulse signal that periodically and alternately change to the second screen.

19. The non-transitory computer-readable storage medium of claim 18, wherein there is a display phase and a non-display phase in each image display frame, and wherein the electronic device is further configured to:

deliver, in a first image display frame in n image display frames, a first control command to the DDIC in the non-display phase, wherein the first control command is to control the DDIC to output the first pulse signal to the first screen and output the second pulse signal to the second screen in the display phase in the n image display frames;

deliver, after display of the n image display frames is completed, in the first image display frame in m image display frames, a second control command to the DDIC in the non-display phase, wherein the second control command is to control the DDIC to output the first pulse signal to the first screen and output the third pulse signal to the second screen in the display phase in the m image display frames, and n and m are positive integers; and periodically deliver the first control command and the second control command to the DDIC, to control the DDIC to output the first pulse signal to the first screen and output the second pulse signal and the third pulse signal that alternately change to the second screen.

20. The non-transitory computer-readable storage medium of claim 18, wherein the foldable screen comprises a display panel, the display panel has a display area and a peripheral area around the display area, the peripheral area is provided with a first group of shift registers and a data driver that are connected to the DDIC, and the first group of shift registers is connected to each row of sub pixels in the N rows of sub pixels and is configured to scan each row of sub pixels, wherein N is a positive integer, wherein the data driver is configured to provide a data voltage for each row of sub pixels during scanning of the sub pixels, wherein the second pulse signal comprises a first start signal, and the third pulse signal comprises a second start signal, and wherein successively scanning the N rows of sub pixels under the control of the second pulse signal, and writing a second data voltage into each row of sub pixels under the control of the second pulse signal during scanning of the sub pixels comprises:

controlling, in each of n image display frames the DDIC to output the first start signal to the first group of shift registers, and scanning, by the first group of shift registers, each row of sub pixels in the N rows of sub pixels under the control of the first start signal; and controlling, during scanning of each row of sub pixels, the DDIC to output a first data signal to the data driver, and writing, by the data driver, the second data voltage into the sub pixels under the control of the first data signal, wherein not scanning the N rows of sub pixels under the control of the third pulse signal comprises controlling, after display of the n image display frames is completed, in each of m image display frames, the DDIC to output the second start signal to the first group of shift registers, and scanning, by the first group of shift registers, none of the N rows of sub pixels under the control of the second start signal.

* * * * *